United States Patent
Hurmi

[11] Patent Number: 5,323,961
[45] Date of Patent: Jun. 28, 1994

[54] APPARATUS FOR CONTROLLING UNIT VENTILATORS

[75] Inventor: Darryl G. Hurmi, Elk Grove Village, Ill.

[73] Assignee: Landis & Gyr Powers, Inc., Deerfield, Ill.

[21] Appl. No.: 48,124

[22] Filed: Apr. 14, 1993

Related U.S. Application Data

[63] Continuation of Ser. No. 714,147, Jun. 11, 1991, abandoned.

[51] Int. Cl.5 .................................................. F24F 11/04
[52] U.S. Cl. ........................................ 236/38; 165/39; 236/84
[58] Field of Search ...................... 236/13, 49.3, 91 F, 236/38, 84; 165/22, 39

[56] References Cited

U.S. PATENT DOCUMENTS

| | | | |
|---|---|---|---|
| 2,727,691 | 12/1955 | Alyea et al. | 236/38 |
| 3,220,649 | 11/1965 | Story | 236/38 |
| 4,328,926 | 5/1982 | Hall, Jr. | 236/13 |
| 4,356,705 | 11/1982 | Sutoh et al. | |
| 4,500,034 | 2/1985 | Reese et al. | 236/84 X |
| 4,649,709 | 3/1987 | Kagohata et al. | 236/49.3 |

Primary Examiner—William E. Wayner
Attorney, Agent, or Firm—Greer, Burns & Crain, Ltd.

[57] ABSTRACT

A controller for unit ventilators which include processing means having associated memory that enables control schemes to be used. The controller is modular and compact in its construction, is easily installed in existing unit ventilators and provides not only the controlled pneumatic pressure in the output lines for the controller, but also provides electrical control signals for controlling the operation of the fan. The controller is adapted to control unit ventilators having auxiliary radiation and is also adapted to control ASHRAE cycle 3 type installations.

27 Claims, 20 Drawing Sheets

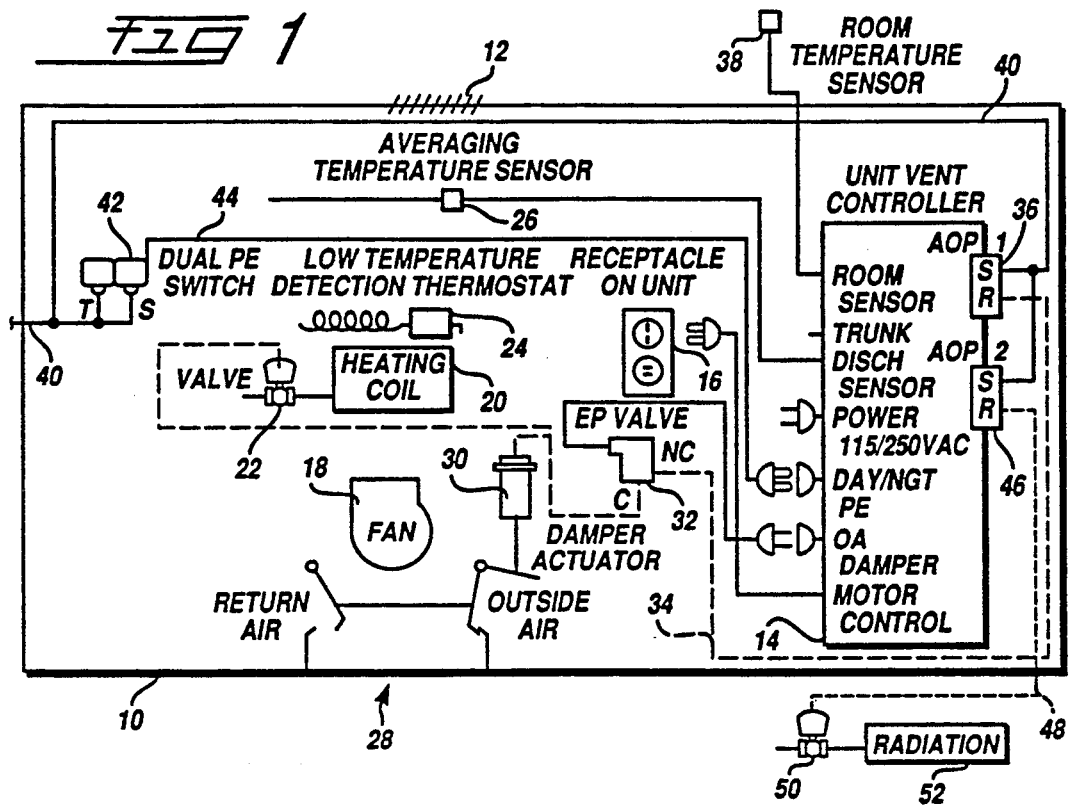
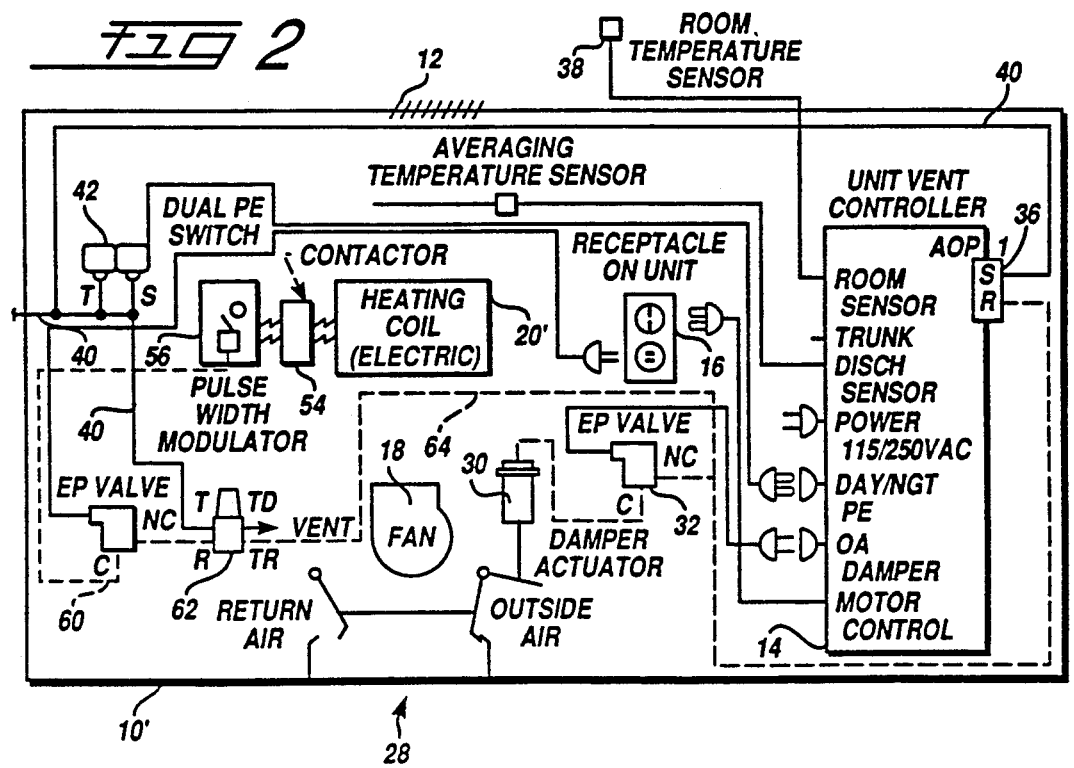

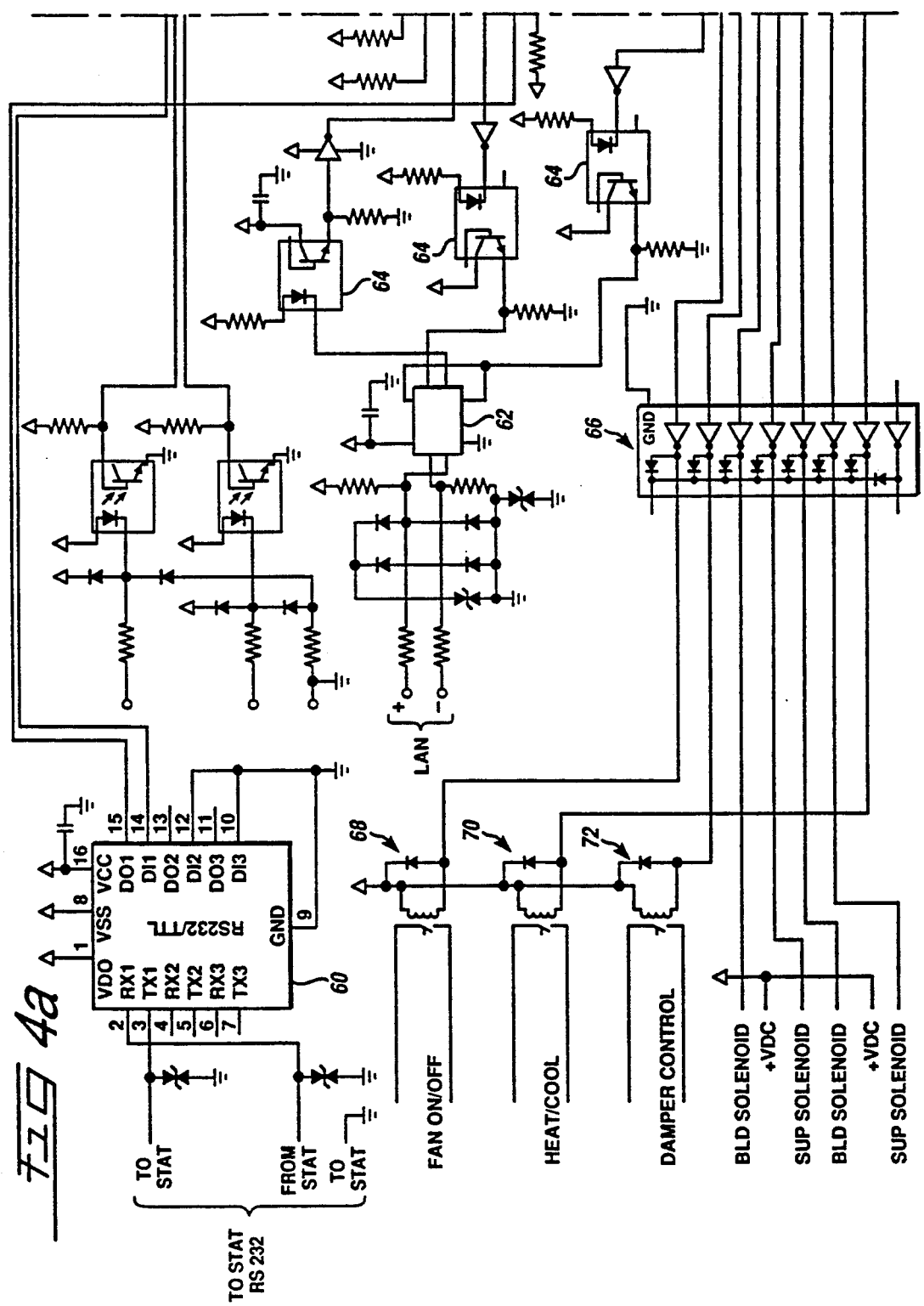

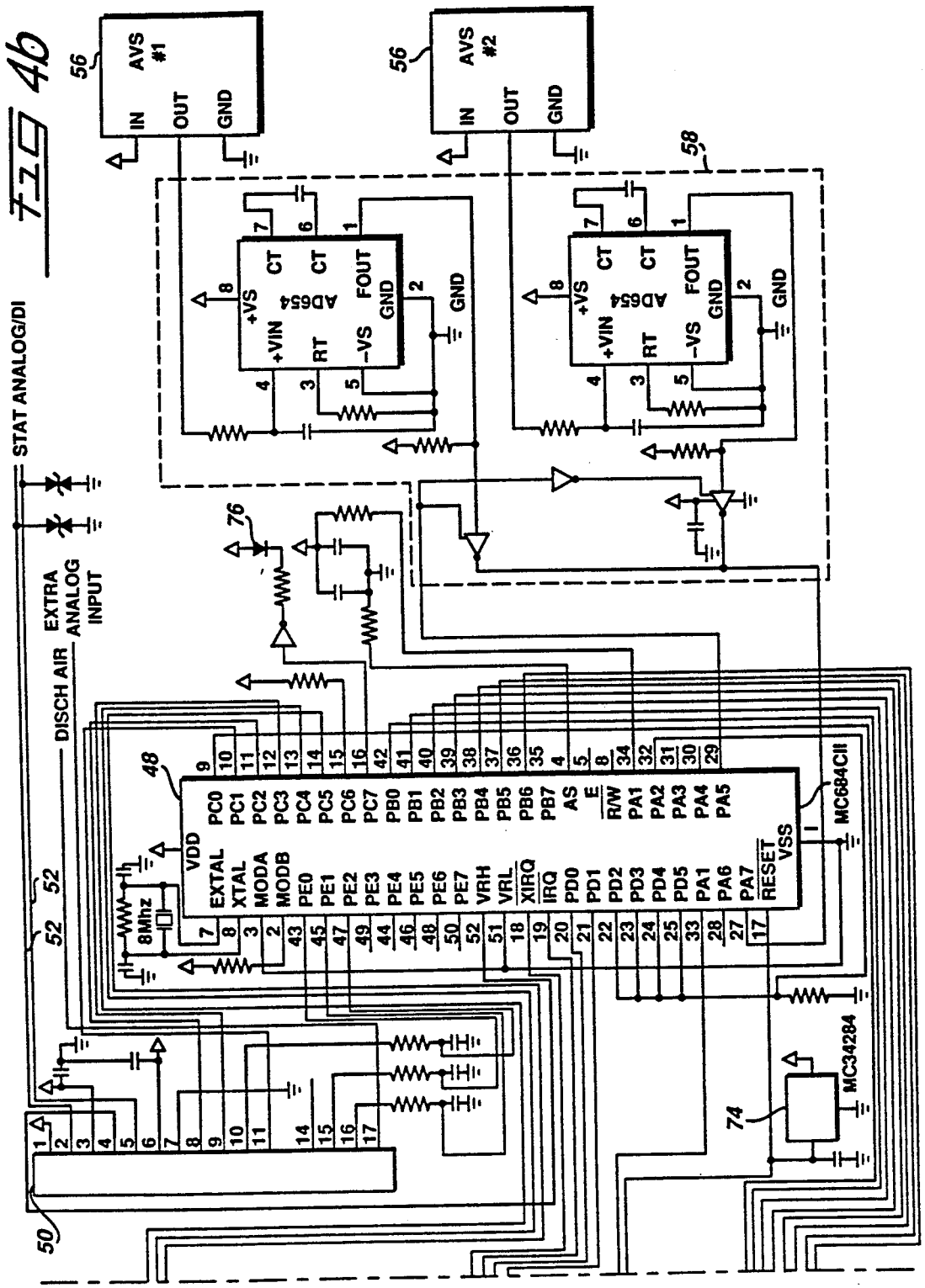

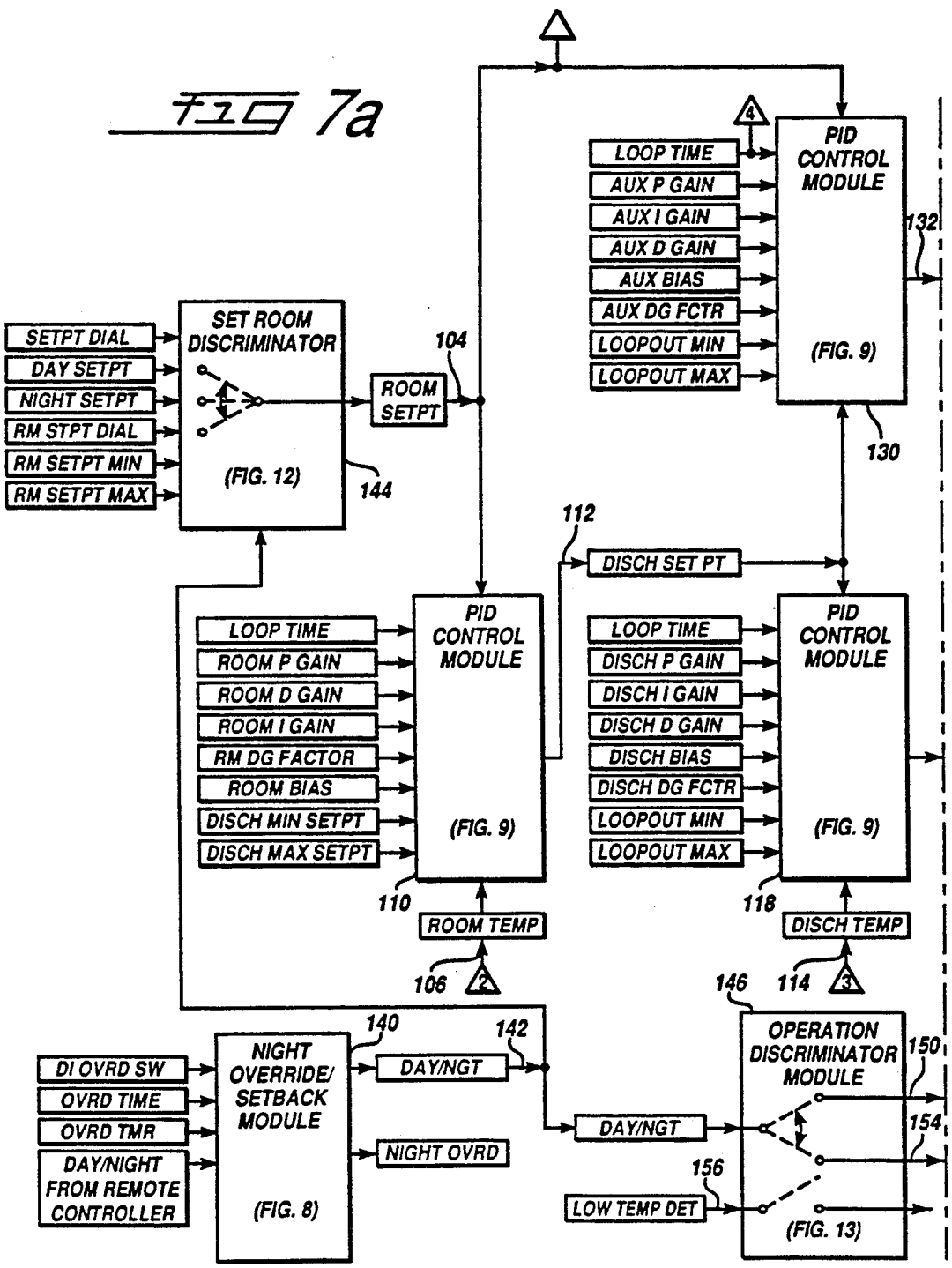

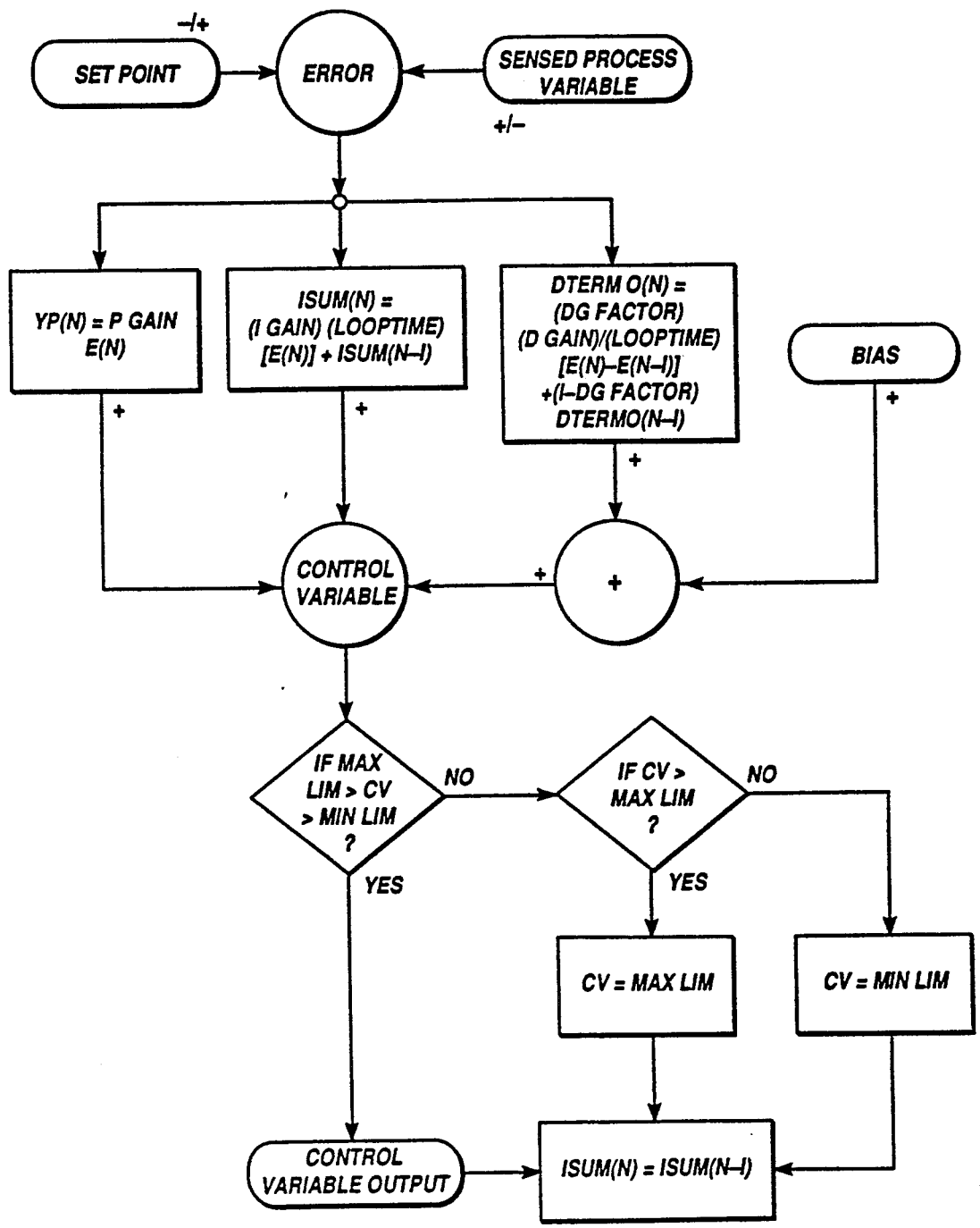

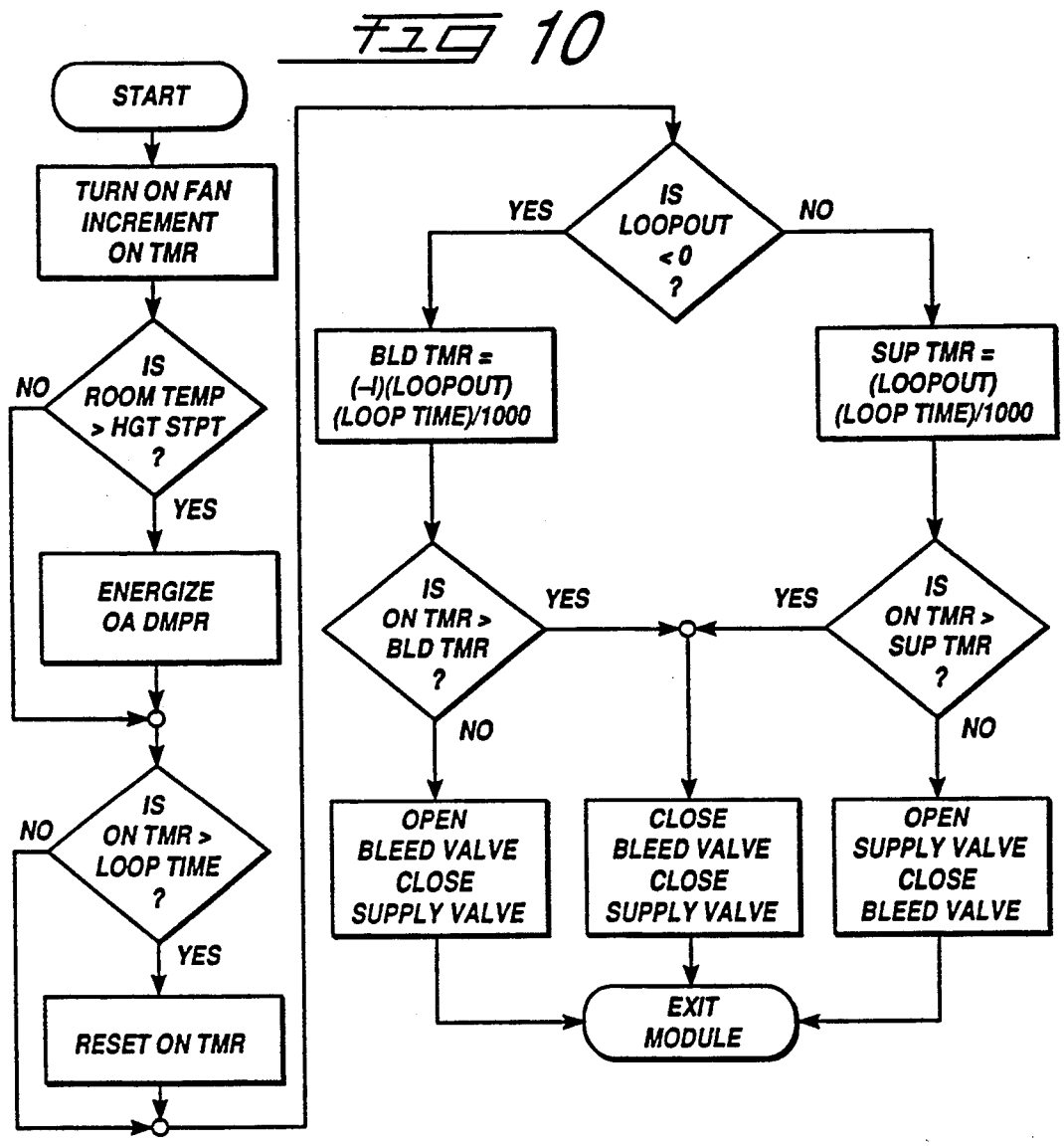
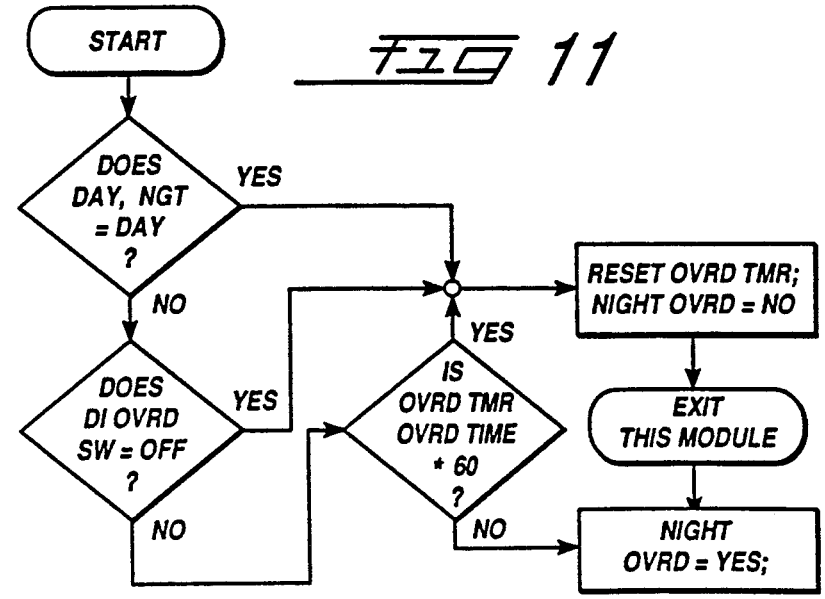

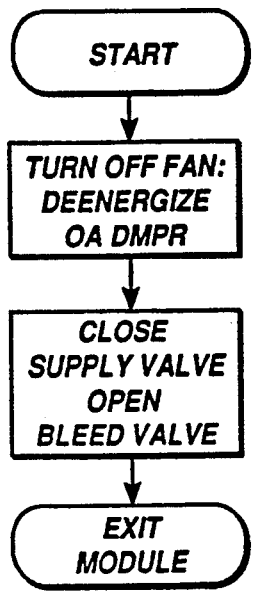
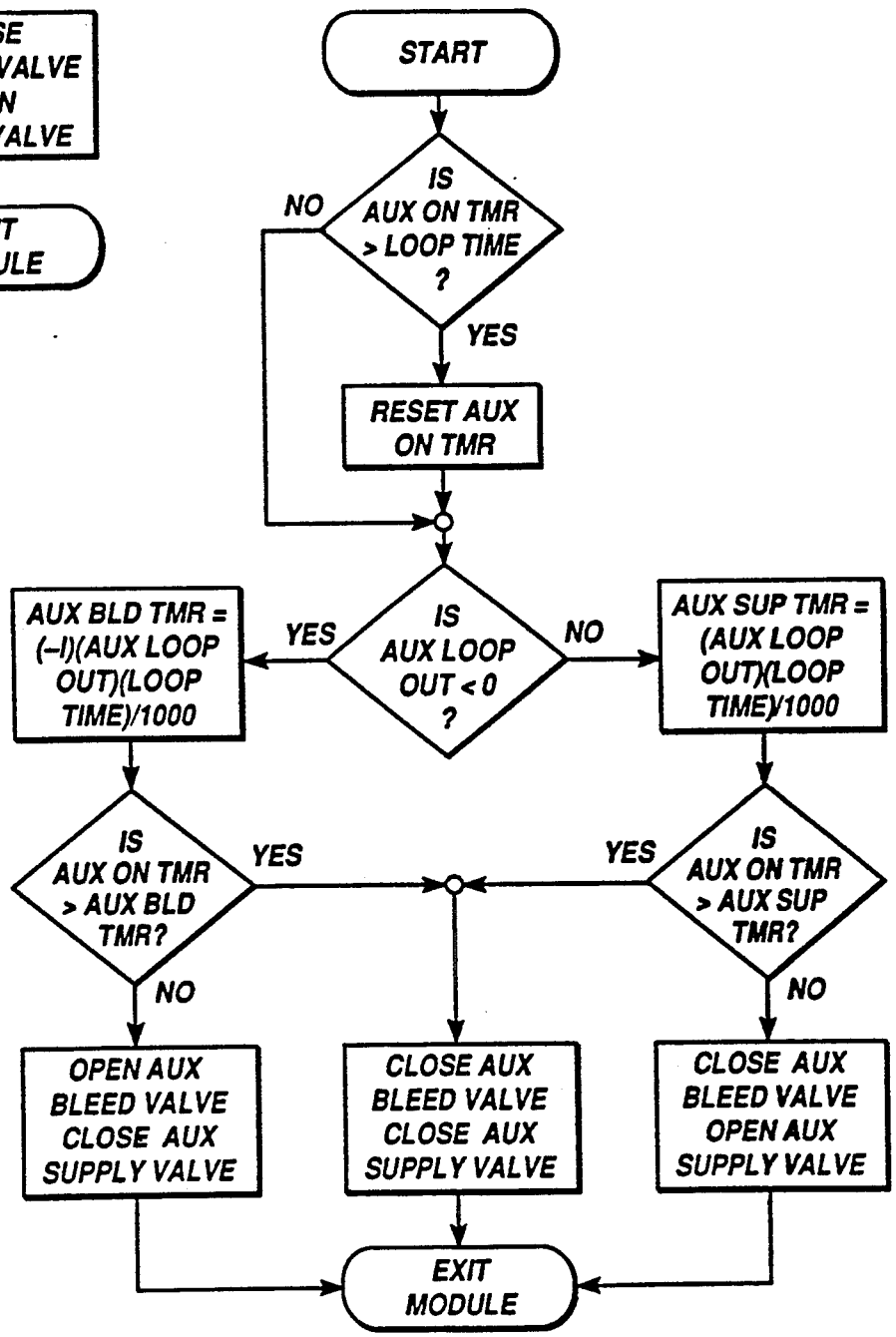

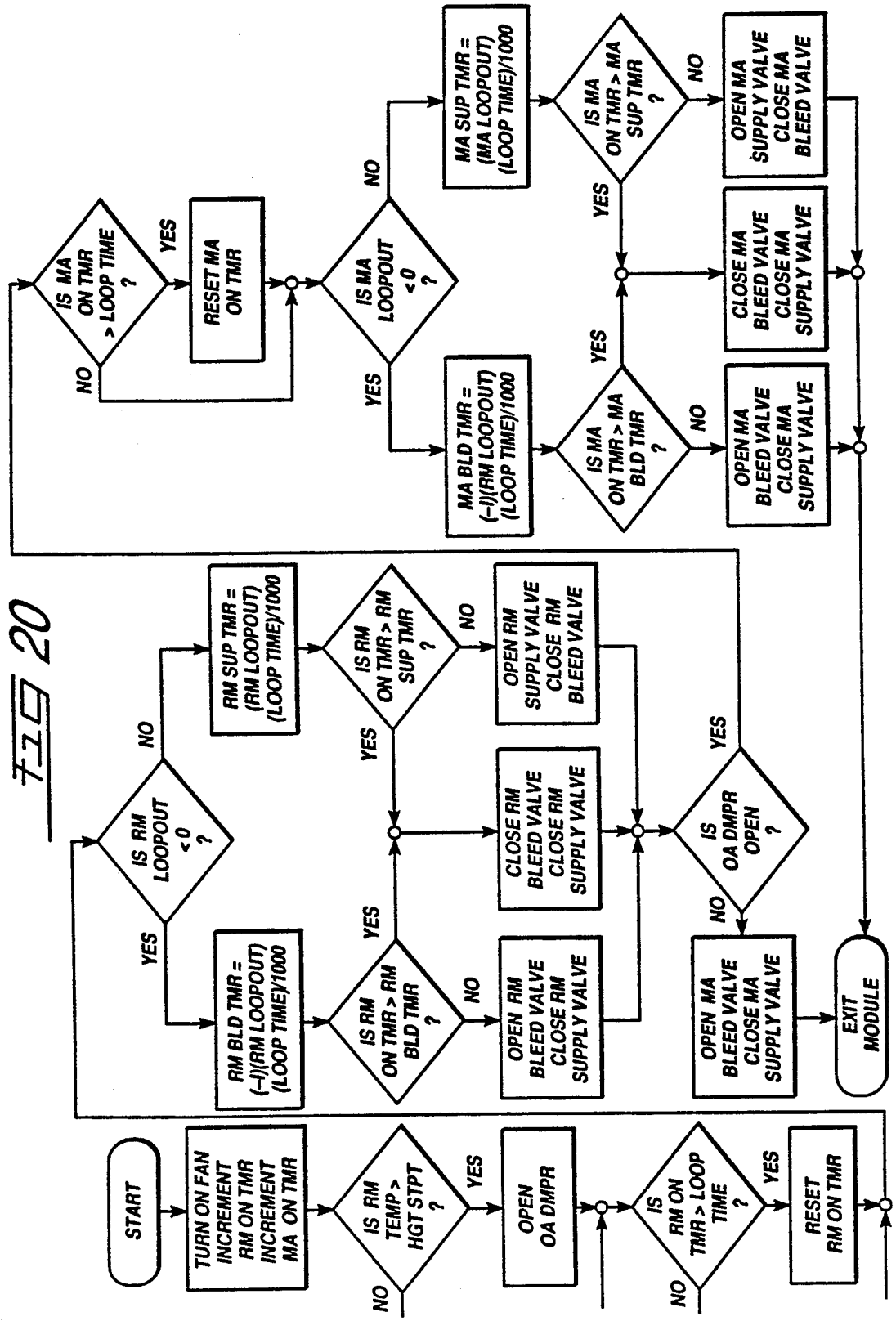

APPARATUS FOR CONTROLLING UNIT VENTILATORS

This is a continuation of application Ser. No. 07/714,147, filed Jun. 11, 1991, now abandoned.

CROSS-REFERENCE TO RELATED APPLICATIONS

Cascaded Control Apparatus for Controlling Unit Ventilators, Ser. No. 07/713,655, filed Jun. 11, 1991, by Darryl G. Hurmi (Our File 53408).

Output Pressure Control Apparatus, by Darryl G. Hurmi, Ser. No. 07/713,654, filed Jun. 11, 1991.

BACKGROUND OF THE INVENTION

The present invention generally relates to apparatus for controlling heating and ventilating equipment, and more particularly for controlling heating and ventilating units and associated equipment that are often used in individual rooms of schools and the like, often referred to in the art as unit ventilators.

In the art of heating, ventilating and air conditioning (HVAC) for buildings and the like there has been a continuing effort in developing more accurate and sophisticated controls for accurately controlling the systems to provide more accurate control in terms of maintaining the desired temperature within a space, and minimizing the energy required to provide heating and/or air conditioning, and in providing increased safety. With the increased utilization of computers, such systems can now be controlled by what had been considered to be complex control schemes that had been used in only very expensive, sophisticated supervisory and control systems. In many of such systems, pneumatic pressure control lines extended between components of the system for controlling the operation of the system. The use of such pneumatic lines has existed for decades and systems using the same continue to be installed. As a result of the long use of such pneumatic control lines, there are thousands of systems in existence which are desirable targets for upgrading in the sense that more sophisticated control may be desirable from a cost benefit analysis, given the relatively inexpensive and robust technical capabilities of control systems compared to the seemingly ever increasing cost of energy for providing heating and air conditioning.

Apart from these general considerations, there are many buildings that exist which often are heated in the winter, but because they have little usage in the summer months and other reasons, true air conditioning is not provided in them. A prime example is that of school buildings which have many classrooms that are heated by individual heating units, which are commonly known as unit ventilators. Such unit ventilators are generally connected to a heating plant that communicates heat to the ventilators via a heated fluid, such as hot water or steam lines, although electrical heating elements are sometimes employed.

With the unit ventilators being located in each room, many older unit ventilators are not conducive to being controlled by a single supervisory and control system, except to the extent that the pneumatic control lines can be switched between nominal pressure values which reflect differing set points for day or night operation and the pneumatic lines can be controlled from a common pressure source. Pressure detectors in the unit ventilators are adapted to sense the difference between the day/night nominal pressures and therefore provide some degree of control, albeit not overly sophisticated. The temperature control of the rooms is provided by a pneumatic thermostat located within the room at some distance from the unit ventilator so that it provides a fair reading of the temperature of the room rather than the discharge temperature of the air that flows from the unit ventilator.

Unit ventilators generally have a damper for controlling the admission of air from outside the room, and also typically employ a fan which forces air through the ventilator which obviously includes heating coils.

Accordingly, it is a primary object of the present invention to provide an improved controller for use with unit ventilators of the type described above.

A related object is to provide such an improved controller which incorporates a processing means and is therefore adapted to utilize relatively complex and sophisticated control schemes in the operation of the controller.

Another related object lies in the provision for interconnecting the unit ventilator controllers with a remote control means so that centralized operation of many unit ventilators in a building or the like can be performed.

Still another object of the present invention is to provide a controller for existing unit ventilators which employ pneumatic control lines, with the controller providing a controlled pressure in one or more pneumatic lines that are used to control pneumatic valves that regulate the position of the outside air damper as well as modulate the flow of heating fluid to the heating coils of the unit ventilator.

Yet another object lies in the provision of providing day or night modes of operation, heating or cooling modes of operation, with each mode having different temperature set points that can be independently determined. An ancillary object lies in the provision for setting the various set points from the remote controller location.

Still another object lies in the provision for enabling or disabling the room thermostat set point control, so that a room set point may be determined from the remote controller means location rather than by an individual in the room itself.

Another object of the present invention is to provide such an improved controller for unit ventilators which utilizes control schemes and input parameters that include signals that are generated that are indicative of the pneumatic output line control pressure, the room temperature, the temperature of the air immediately downstream of the heating coils, i.e., the discharge temperature of the unit.

Still another object of the present invention is to provide such an improved controller for unit ventilators which is modular and compact in its construction, is easily installed in existing unit ventilators and provides not only the controlled pneumatic pressure in the output lines for the controller, but also provides electrical control signals for controlling the operation of the fan.

Yet another object of the present invention is to provide such an improved controller for unit ventilators which include processing means having associated memory that provides extreme flexibility in the operation of the control of the unit ventilator in the sense that control schemes may be provided and changed to employ any desired control algorithm that may beneficially operate the controller, provided that the size of the algorithm is consistent with the memory size.

These and other objects will become apparent upon reading the following detailed description of the present invention, while referring to the attached drawings, in which:

FIG. 1 is a schematic illustration of a unit ventilator and the controller embodying the present invention, the unit ventilator being of the type which has a source of heat comprising steam or hot water, the ventilator also being illustrated in association with an auxiliary radiation capability which may comprise baseboard heaters that are located in other areas of the space in which the unit ventilator is located;

FIG. 2 is another schematic illustration of a unit ventilator having a unit ventilator controller embodying the present invention, with the unit ventilator being of the type which employs an electric heating coil;

Figure 3:
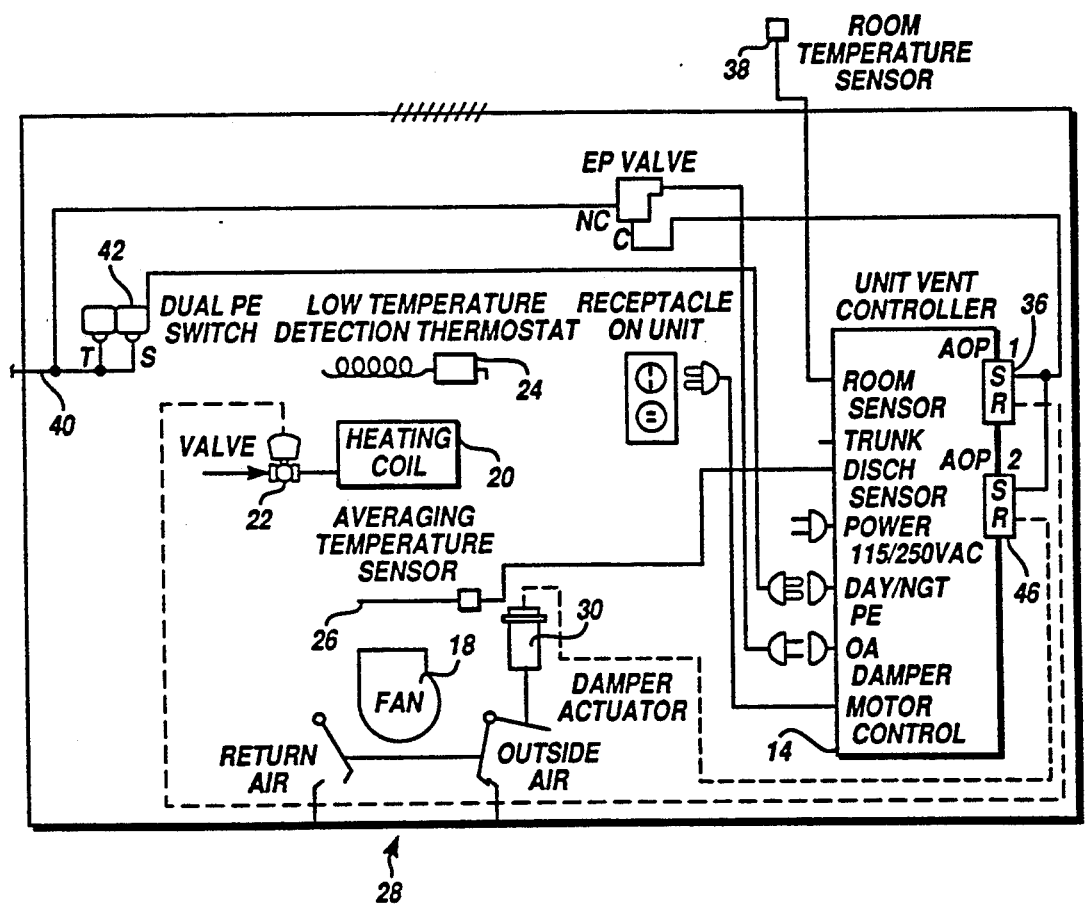
FIG. 3 is another schematic illustration of a unit ventilator and a unit ventilator controller embodying the present invention with the unit ventilator being connected in accordance with an ASHRAE cycle 3 type of operation, with the outside air damper being controlled independently of the control of the heating coil.
Figure 5:
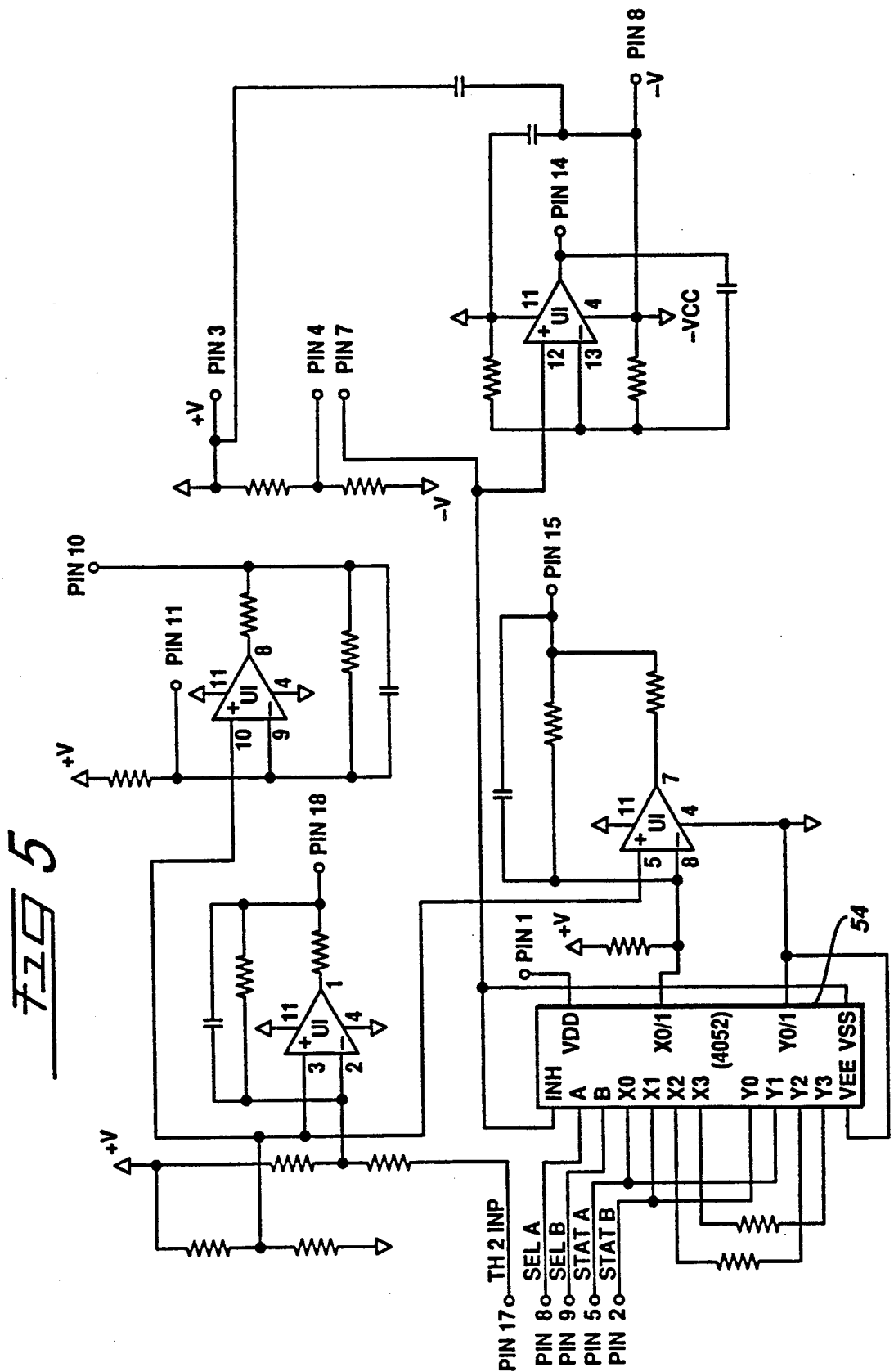
Figure 6:
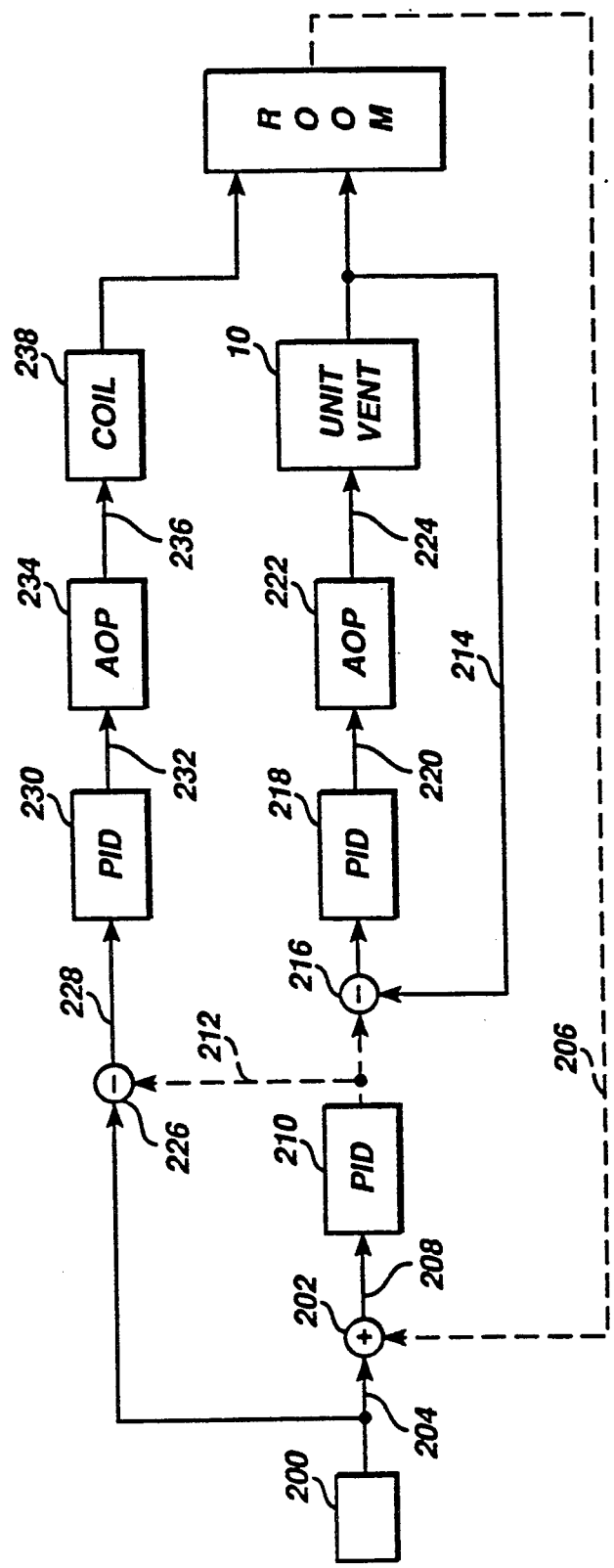
Figure 7B:
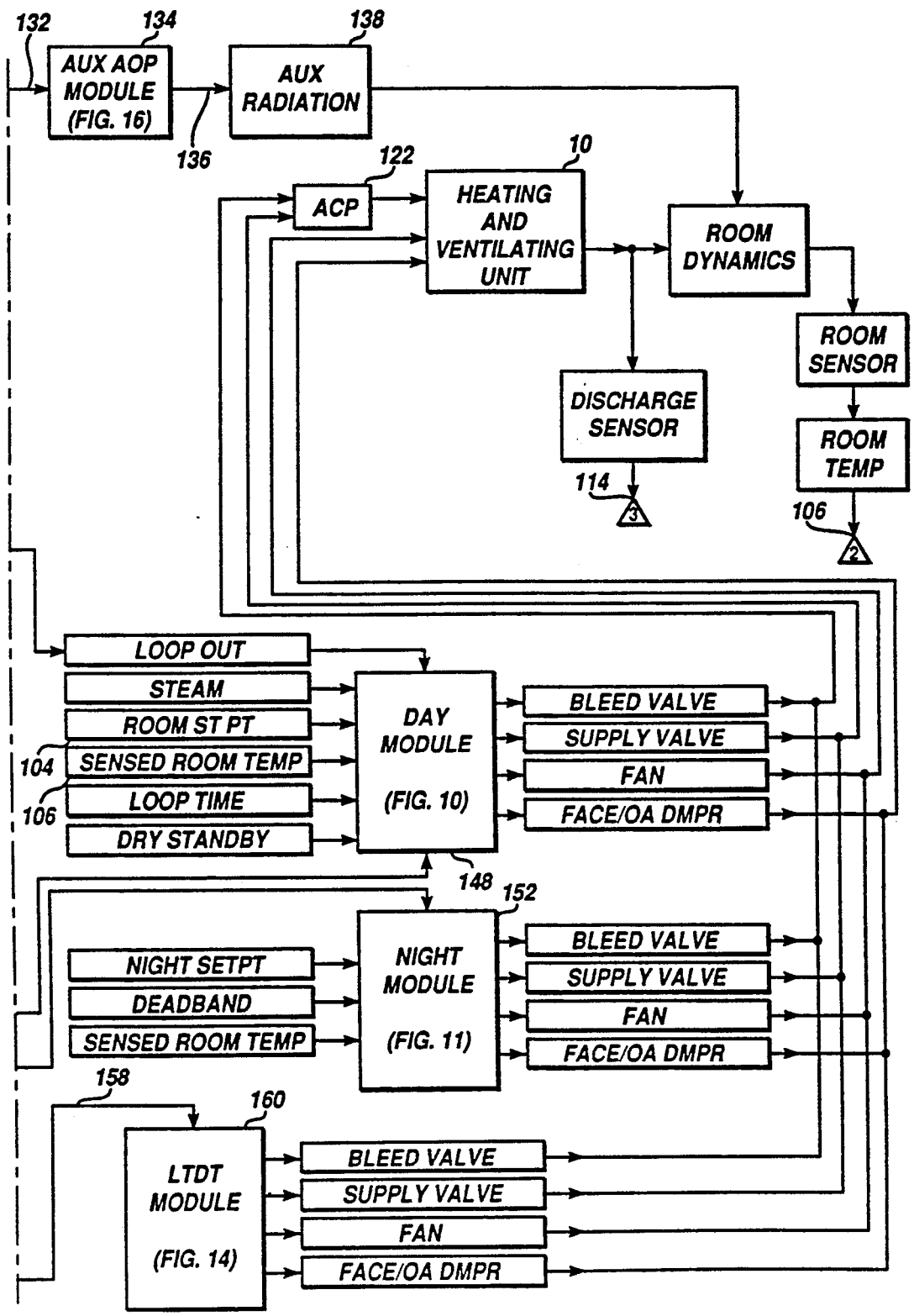
Figure 8:
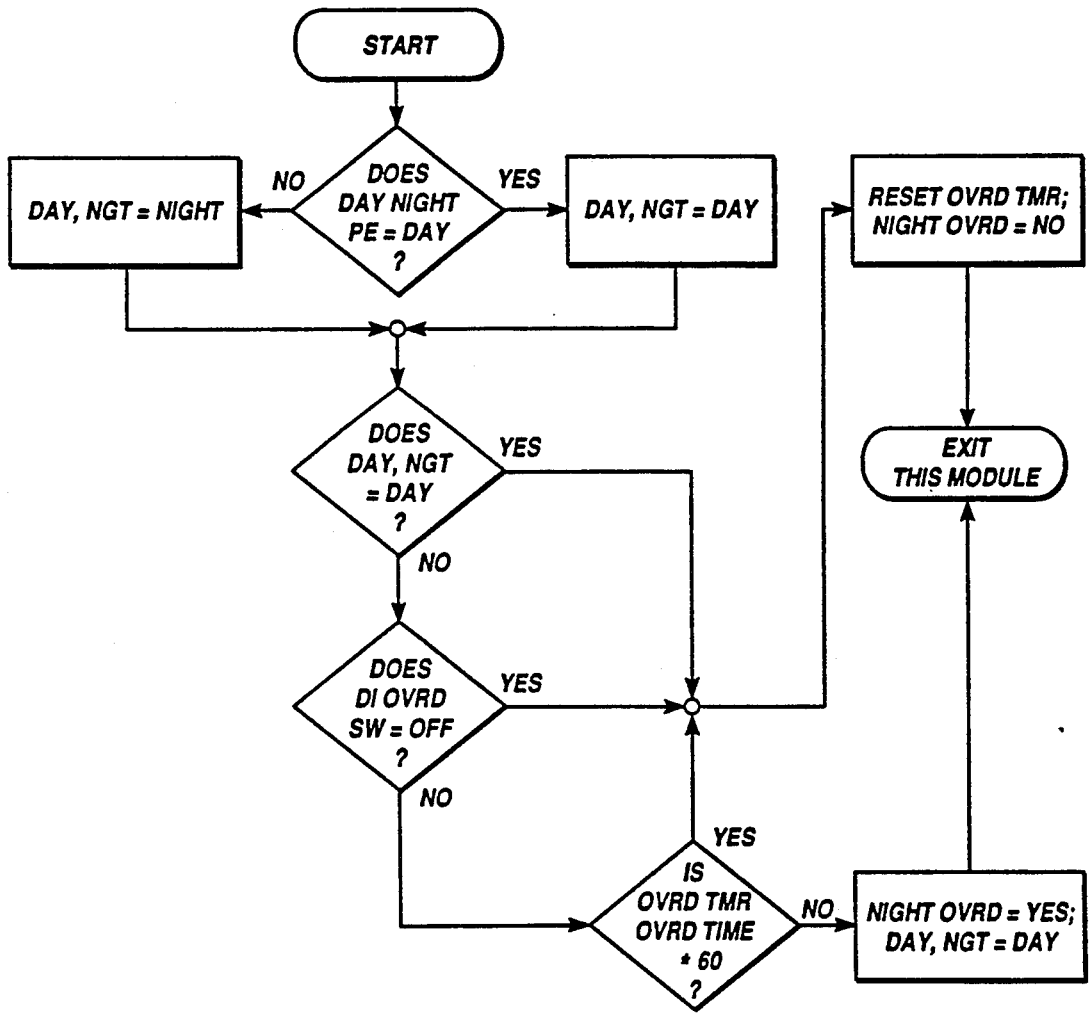
Figure 12:
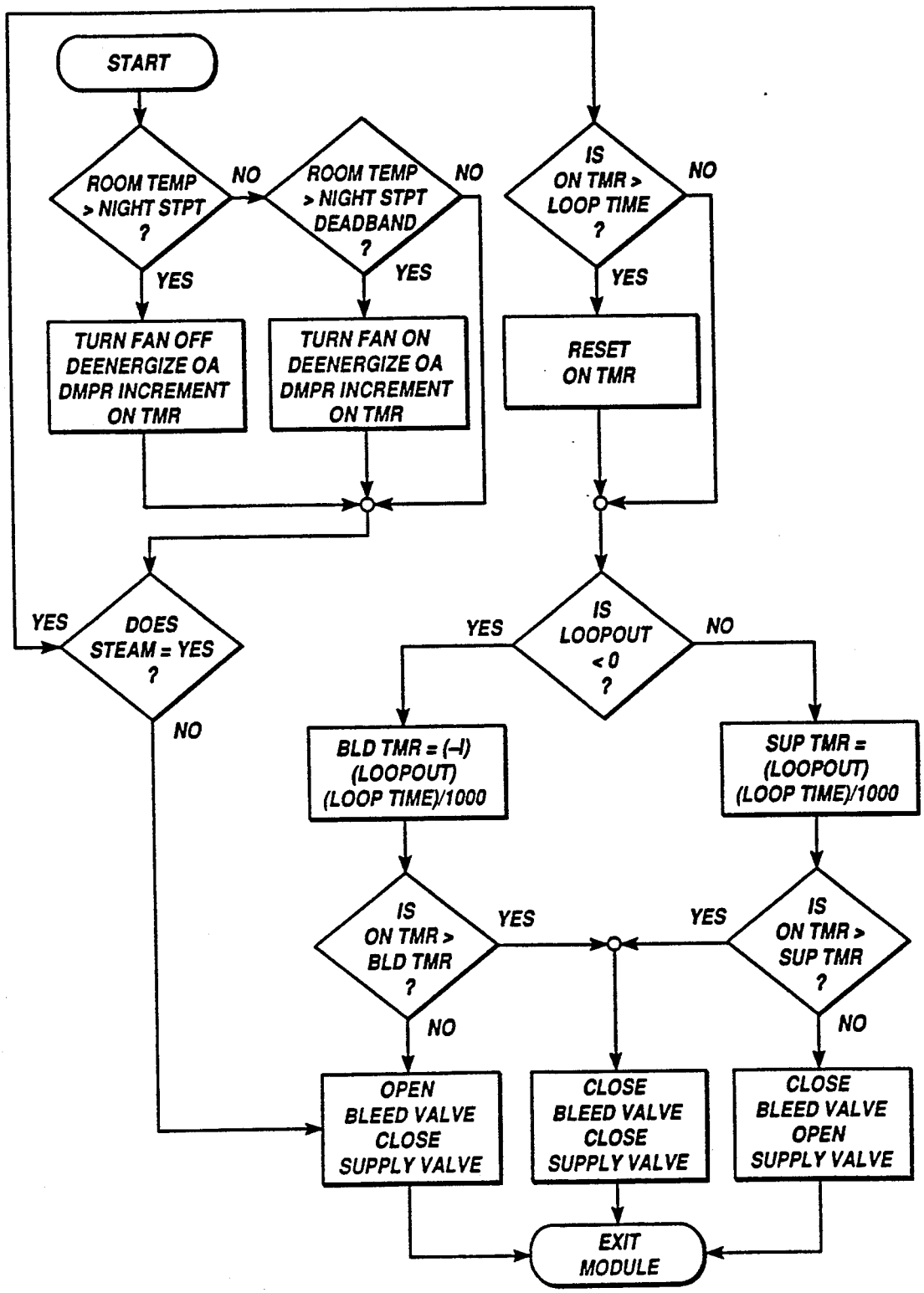
Figure 13:
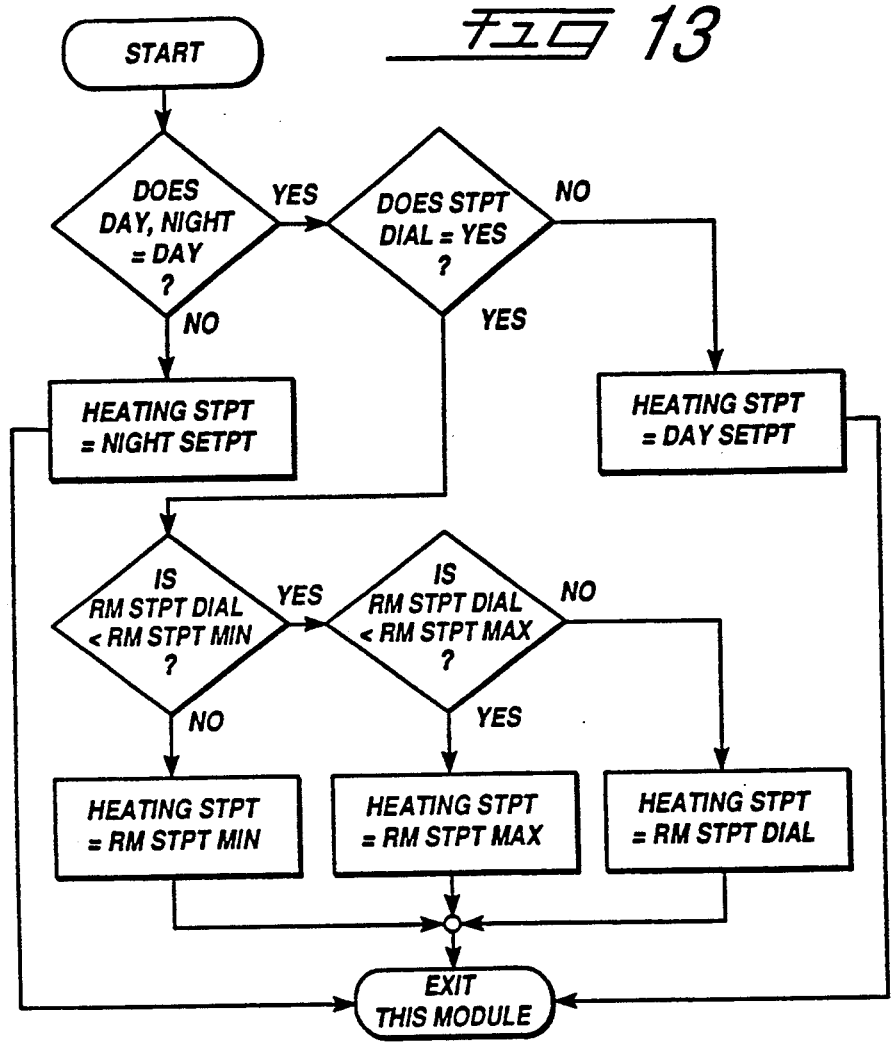
Figure 14:
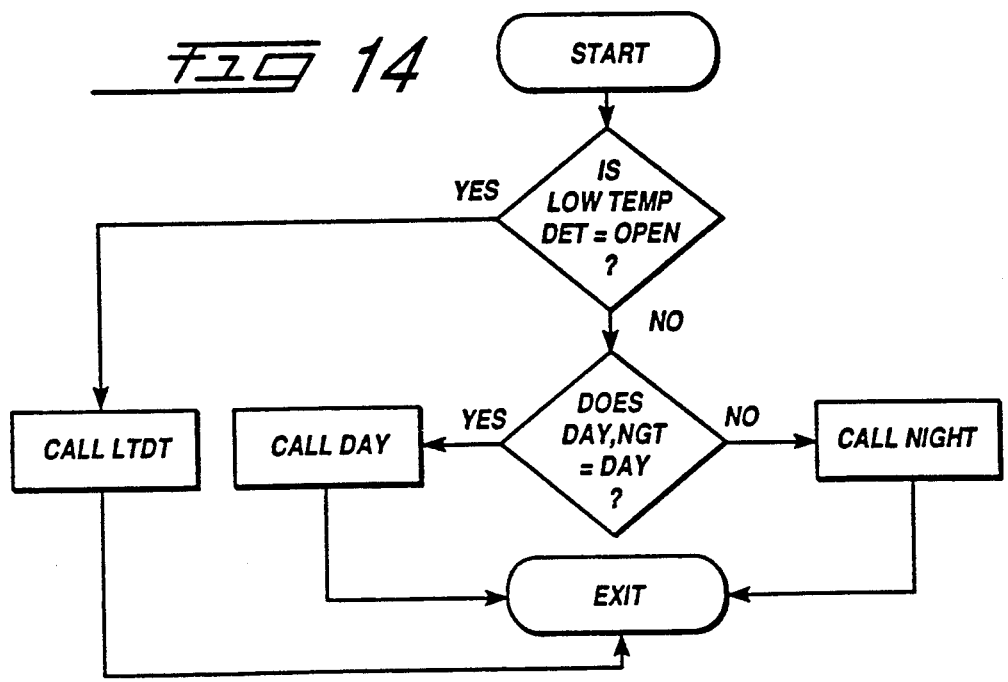
Figure 17:
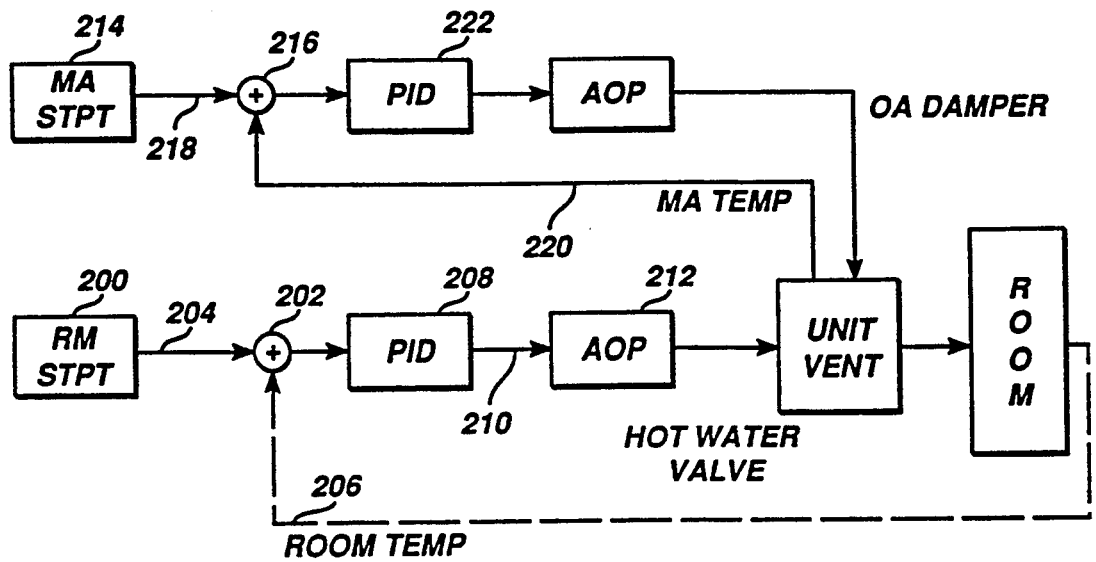
Figure 19:
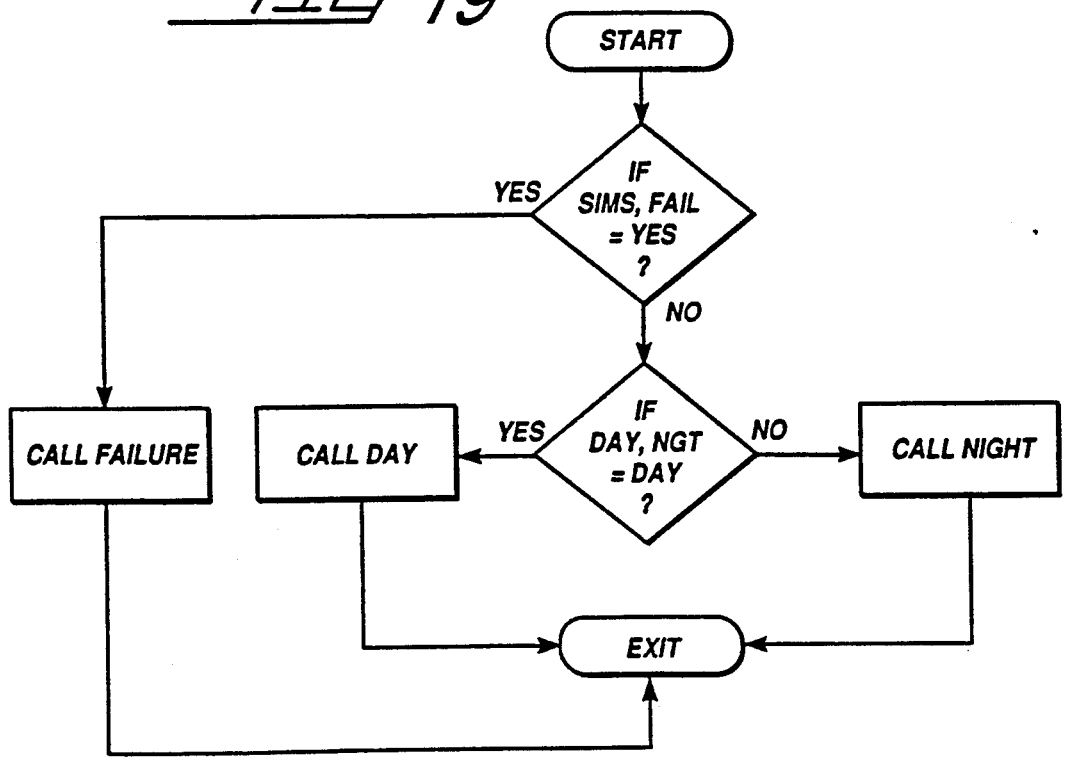
Figure 18A:
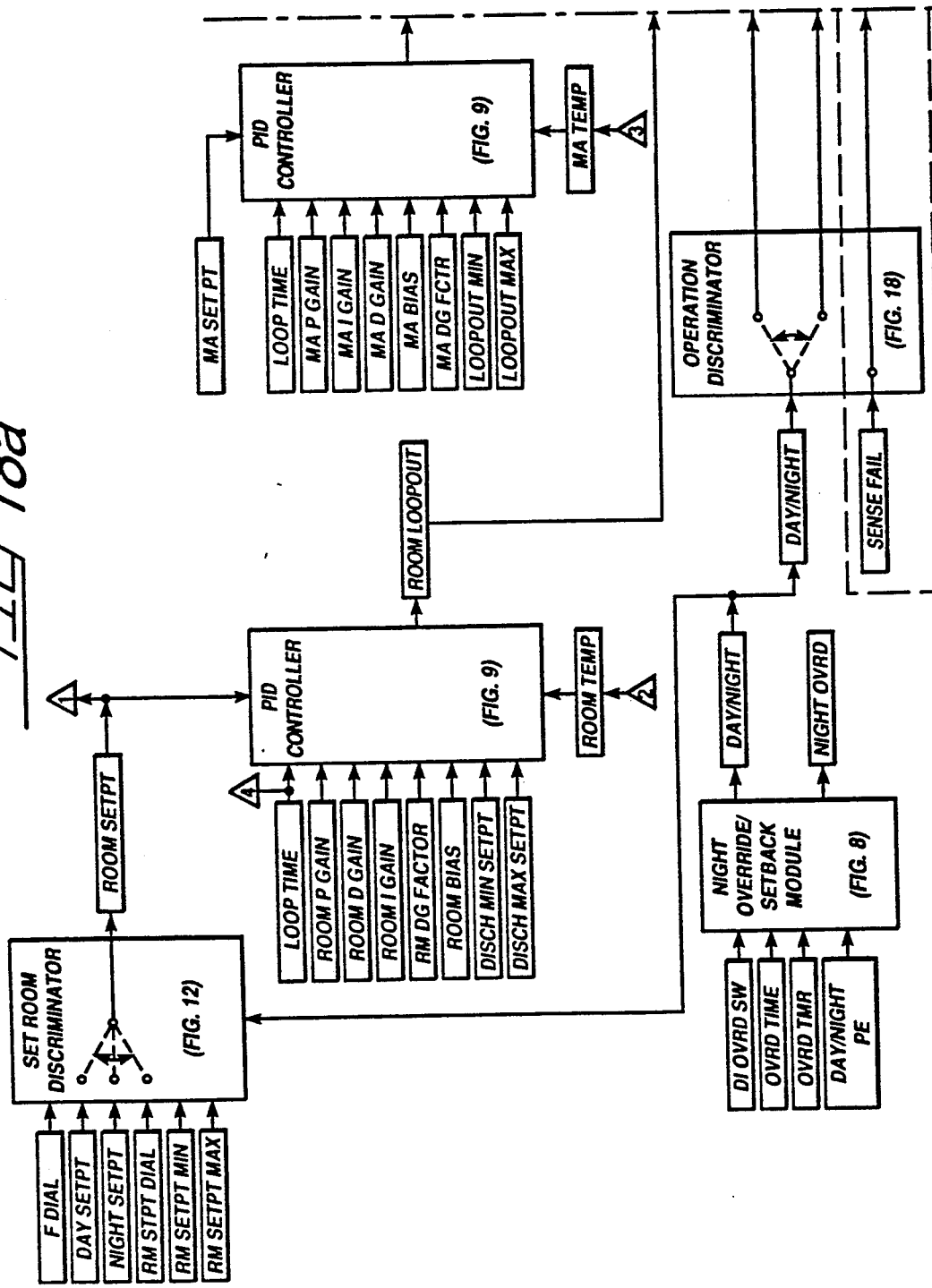
Figure 18B:
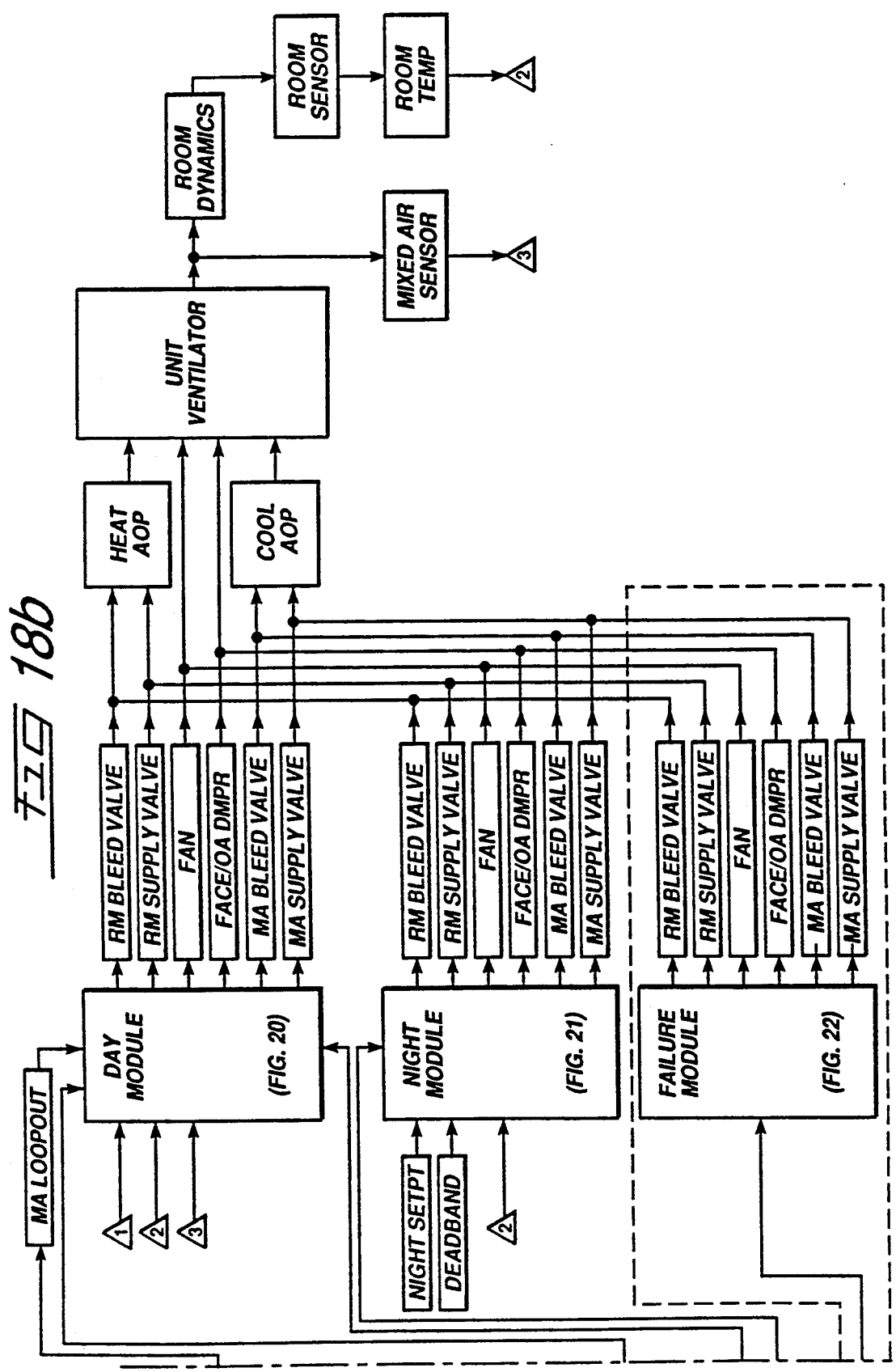
Figure 21:
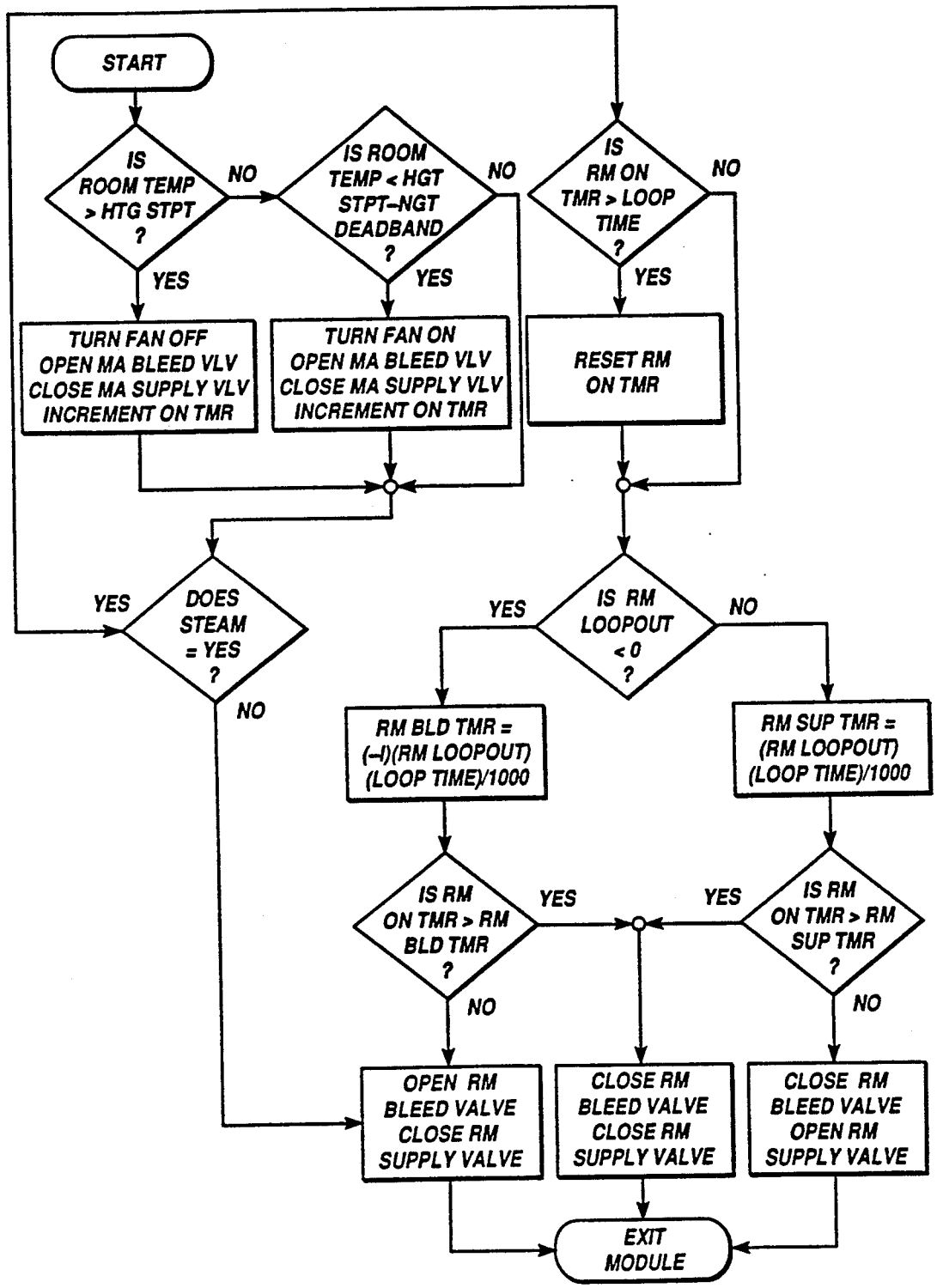
Figure 22:
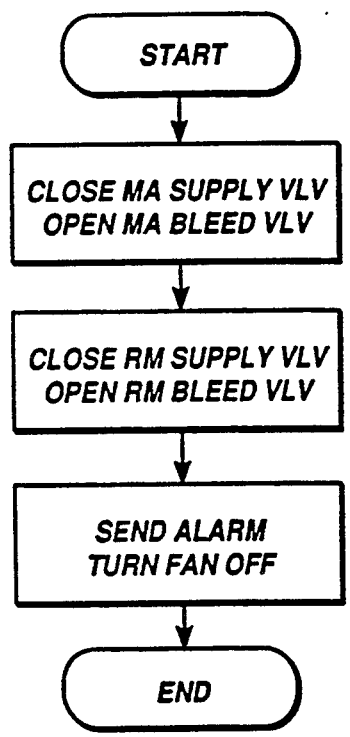

FIGS. 4a and 4b together comprise a detailed electrical schematic diagram of the circuitry of the controller embodying the present invention;

FIG. 5 is a detailed electrical schematic diagram of an integrated circuit that is employed in the circuitry of FIG. 4b;

FIG. 6 is a broad flow chart for the operation of the unit vent controller;

FIGS. 7a and 7b together comprise a more detailed flow chart of the flow chart shown in FIG. 6;

FIG. 8 is a flow chart illustrating the operation of the night override/setback module shown in FIG. 7a;

FIG. 9 is a flow chart illustrating the operation of the proportional-integral-derivative (PID) control module shown in FIG. 7a;

FIG. 10 is a flow chart illustrating the operation of the day module shown in FIG. 7b;

FIG. 11 is a flow chart showing the operation of the day/night set back module shown in FIG. 7b;

FIG. 12 is a flow chart showing the operation of the night module shown in FIG. 7b;

FIG. 13 is a flow chart showing the operation of the set point discriminator module shown in FIG. 7a;

FIG. 14 is a flow chart showing the operation of the operation discriminator module shown in FIG. 7a;

FIG. 15 is a flow chart showing the operation of the low temperature detect module shown in FIG. 7b;

FIG. 16 is a flow chart showing the operation of the auxiliary AOP module shown in FIG. 7b;

FIG. 17 is a broad flow chart of the operation of the controller as configured to control the unit ventilator shown in FIG. 3;

FIGS. 18a and 18b together show a more detailed flow chart showing the operation of the flow chart shown in FIG. 17;

FIG. 19 is a flow chart showing the operation discriminator module shown in FIG. 18;

FIG. 20 is a detailed flow chart showing the operation of the day module shown in FIG. 18b;

FIG. 21 is a flow chart illustrating the operation of the night module shown in FIG. 18b; and FIG. 22 is a flow chart showing the operation of the failure module shown in FIG. 18b.

DETAILED DESCRIPTION

Broadly stated, the present invention is directed to a controller apparatus that is adapted for controlling unit ventilators of the type which have a heating coil, a fan, and a damper for admitting outside air into a room in which the unit ventilator is located.

The controller apparatus embodying the present invention is adapted to be installed in new unit ventilators and is particularly suited for installation in existing unit ventilators of various types, including those which have auxiliary radiation means, such as baseboard radiation units that are located in a room in which the unit ventilator is installed, and in unit ventilators that operate with steam, hot water and even electrical heating. Moreover, in one of its alternatives, i.e., ASHRAE cycle 3 type installations, the controller is adapted to control the outside air damper independently of the valve which controls the operation of the heating coil, whether the heat is supplied either by steam, hot water or an electric heating element.

Turning now to the drawings, and particularly FIG. 1, there is shown a schematic illustration of a unit ventilator which has an outer enclosure 10 which has a grill or suitable openings 12 through which heated air can pass during operation of the unit ventilator. The unit ventilator controller embodying the present invention, indicated generally at 14, is shown to be located within the confines of the ventilator, but this is not necessary, and it is contemplated that the controller may be located in the plenum above the ceiling of the room in which the ventilator is located, with the various connections extending from the controller to the unit ventilator 10 itself.

While there is a receptacle 16 typically located in the unit ventilator for supplying 110 volt alternating current power to which the unit ventilator controller 14 may be connected, such a receptacle may obviously be located in the plenum if the controller is also located there. The unit ventilator also includes a fan 18, a heating coil 20, through which steam or hot water may flow, with this being controlled by a pneumatically controlled valve 22 that is connected in the steam or hot water line that is a part of the heating system of the physical plant. Immediately downstream of the heating coil is a low temperature detection thermostat 24 and an averaging temperature sensor 26 which measures the discharge temperature of the air that is passed over the heating coil 20, driven by the fan 18. It is this air which passes through the grill 12 into the room.

A damper indicated generally at 28 is also provided for admitting outside air or return air from the room and this air supplies the air to the fan. The damper 28 is operated to enable a mixture of return air and outside air to feed the fan and the position of the damper is controlled by a damper actuator 30. The valve 22 and damper actuator 30 are pneumatically controlled from a pneumatic valve 32 that is controlled via line 34 which is connected to the regulated output of an analog pneumatic output module 36 that is part of the unit vent controller. The specific pressure level in the line 34 controls the output from the valve to position the damper and also control the flow of steam or hot water through the valve 22 to the heating coil 20.

From the illustration of FIG. 1 it should be understood that the valve 22 and actuator 30 are not independently controlled, but are in fact controlled together, so that as less heated fluid is allowed to pass through the heating coil, the greater the outside air is admitted to the fan. The temperature of the room is sensed by a room temperature sensor 38 which is preferably a thermostat having a room set point capability and the room temperature sensor 38 is preferably spaced from the unit ventilator outlet at some location in the room so that a reliable temperature that is indicative of the room temperature is sensed.

While the output of the pneumatic analog output module 36 is a regulated pressure, it is connected to a supply pressure via line 40 that is provided from a main supply that is connected to many components of the heating and ventilating system of the building or the like. The line 40 is also connected to a dual pneumatic-to-electric switch 42 which senses either a high or low pressure, commonly 18 or 25 p.s.i. and this indication is provided on line 44 that extends to the controller 14. It is common for day/night modes of operation to be controlled by switching between the high and low pressures and the signal provided by the switch 42 provides such a mode indication to the unit vent controller for those kinds of systems which do not have an electronic communication capability.

It should be understood that the unit vent controller is also adapted to have a local area network communication capability if desired so that it can be interconnected with a main remote control station and in such event, the switch 42 may be eliminated.

In the embodiment shown in FIG. 1, a second pneumatic analog output (AOP) module 46 is included for providing a controlled pneumatic output pressure in line 48 that extends to a valve 50 that controls the flow of heating fluid through external radiation devices 52, such as baseboard radiators or the like, which may provide supplemental heating in the room in addition to that which is provided by the unit ventilator itself. It should be understood that in the event that no supplemental radiation heating is required, then the second module 46 would not be required.

Turning to the embodiment shown in FIG. 2, components which are virtually are identical, have been given the same reference numbers and will not be again described. The main difference between this unit ventilator 10' and the unit ventilator 10 shown in FIG. 1 is that it has a heating coil 20' which is an electric heating coil Since there is an electric heating coil, a contactor switch 54 is provided for controlling the energization of the heating coil and a pulse width modulator 56 is provided which controls the operation of the modulator based upon a pneumatic output valve 58 that has a pneumatic output line 60 that controls the pulse width modulator 56. The valve 58 is itself controlled by a relay 62 that is pneumatically controlled via line 64 that extends to valve 32 and to the AOP module 36 associated with the unit ventilator 14. The supply line 40 also extends to the return air relay 62.

With respect to the unit ventilator shown in FIG. 3, it is connected in accordance with ASHRAE cycle 3 type of operation and this unit ventilator also has numerical designations that are identical to that shown in FIG. 1 where the comparable component is utilized and they will not be again described. In this ventilator, there are two analog output pressure modules 36 and 46, but the second module 46 is not connected to external radiation, but is connected to the damper actuator 30 and the first module 36 has its regulated output connected to the valve 22 that controls the heating fluid to the heating coil 20. Unlike the unit ventilator in FIG. 1, the averaging temperature sensor 26 is not located downstream of the heating coil 20, but is located between the heating coil 20 and the fan 18. In this type of operation, the unit ventilator 14 independently controls the position of the damper 28 and the flow of heating fluid through the valve 22.

The electrical circuitry for the unit ventilator controller 14 of the present invention is illustrated in FIGS. 4a, 4b and 5, with FIGS. 4a and 4b being left and right segments of a single drawing. The controller 14 includes a microprocessor 48 (FIG. 4b), preferably a Motorola MC68HC11, which is connected by two lines to an integrated circuit 50 which is shown in detail in FIG. 5, and which is an analog circuit conditioning circuit for connecting to temperature sensing thermistors and to the room thermostat. The pin numbers for the integrated circuit 50 are shown in both FIGS. 4b and 5. The circuit 50 has two lines 52 which are connected to the room thermostat 38 and it is adapted to provide the room temperature set point as well as provide a digital input value that is adapted to provide a night override command. The circuit 50 also has an input for receiving an analog signal indicating the temperature of the discharge air, from sensor 26, which is preferably a thermistor. The circuit 50 has a multiplexer 54 which selects one of two thermostats to be communicated to the microprocessor 48, since the controller is adapted to control two unit ventilators, as previously described.

The controller 14 includes circuitry relating to two air velocity sensors 56 and associated circuitry 58, which are useful in other applications relating to variable air volume and constant volume control that are not applicable to unit ventilators.

The controller is adapted to be connected to a hand-held computer for the purpose of changing operating characteristics, including set points and the like, and to this end a RS232/TTL connection circuit 60 is provided, which is connected to the microprocessor 48 by two lines as shown. The controller is also adapted for connection to a local area network in the event the unit ventilator is to be controlled by a remote station that may control a number of such unit ventilators. This capability is provided by a TTL/RS45 conversion circuit 62 which is connected to the microprocessor 48 via opto-isolator circuits 64 and associated circuitry.

Outputs from the microprocessor extend to a buffer circuit 66, one output of which operates a relay 68 for providing a fan control on/off output, another of which operates a relay 70 for providing a digital output that selects the heat or cool mode of operation, and a third of which operates a relay 72 for providing a digital output for controlling the operation of the damper. In this regard, when the output is on, the controller is operable to control the position of the damper; when it is off, the damper is kept closed. Four other control lines extend from the microprocessor to the buffer and to the AOP modules 36 and 46, and are operable to control the solenoids associated with the modules as has previously been described.

The controller also has a power failure detection circuit 74 for resetting the microprocessor and a LED 76 that flashes during operation which provides a basic sanity test for the microprocessor.

Turning now to the flow charts which functionally describe the manner in which the controller 10 operates, and referring ring to FIG. 6, the room temperature set point (block 200) is determined by a thermostat or a control means located in the room or at a supervisory control station. The room set point is then applied to a block 204 via line 204 which determines the difference or error between the room temperature discharge set point and the sensed room temperature via line 206. The sensed temperature is supplied by a thermostat located within the room, preferably located some distance away from the heating and ventilating unit discharge so that it measures a temperature that is representative of the room.

The difference between the room set point and the sensed room temperature is then applied by line 208 to a proportional integral derivative (hereinafter PID) control loop block 210 which will be described and which produces an output on line 212 which is the discharge temperature set point for the heating and ventilating unit. In this regard, a temperature sensing device is located near and preferably in the heating and ventilating unit just upstream of the heating coil of the heating and ventilating unit, which provides a signal on line 214 that is indicative of the temperature of the air that is discharged by the heating and ventilating unit.

The discharge set point is applied to block 216 together with the discharge temperature from line 214 and the difference or error between these two values is applied to another PID control loop 218 which produces an output signal on line 220 that controls an analog output pneumatic module 222 (hereinafter AOP) that controls the operation of the heating and ventilating unit via line 224.

In the event that the heating unit is installed in a room that has auxiliary heating apart from the heating and ventilating unit itself, another control loop is provided, and it is illustrated in the upper portion of FIG. 6. This portion of the flow chart has the room set point applied to block 226, and the discharge set point on line 212 is also applied. The difference or error between the two values is applied via line 228 to another PID control loop 230 and its output is on line 232 which controls another AOP device 234. The AOP device controls a heating coil 238 via line 236. In this regard, it should be understood that the control of the heating coil 238 is actually the control of a valve in the case of a steam or hot water system or the control of a switch in the case of an electrical heating coil.

The broad flow chart of FIG. 6 is shown in more detail in the flow chart of FIGS. 7a and 7b, which together form the total flow chart. It should be understood that other control features are present in this more detailed flow chart, but those blocks which are common to the flow charts of FIGS. 6 and 7a and 7b are provided with the same reference numbers. It should also be understood that the blocks 202, 216 and 226 which perform the difference or error calculations are not specifically illustrated in the flow chart of FIGS. 7a and 7b and these functions are performed by the PID blocks 210, 218 and 230, respectively. Also, while the preferred embodiment is illustrated in FIG. 6 and that the flow chart of FIG. 7a and 7b is more detailed, the detailed flow chart includes a low temperature detect module (reference numbers 156, 158 and 160) which may not be included in all applications, and to this extent it is intended to be an alternative embodiment. It is included in FIGS. 7a and 7b because of convenience.

Referring to FIG. 7a, there is a day/night override module 140 which is operable to place the heating and ventilating unit in either a day or night mode of operation and also to place the heating and ventilating unit in a day mode of operation when it is otherwise in a night mode. As has been previously described, the night mode is used at night when people are normally not present, and the temperature can be reduced to conserve energy needed for producing heat. The module 140 has the capability of switching to day mode (block 142), thereby providing a night override, and such action triggers an override timer. The module also has the capability of setting the period of time the override extends the default period being for 1 hour, although other periods can be specified. Once the period has expired, the module switches the heating and ventilating unit back into the night mode of operation if it should be operating in that mode.

The normal switching from day to night mode, or vice versa, is done in one of two ways. If the system is pneumatic wherein the source of pneumatic pressure is changed, typically between 18 and 25 psi, such change in pressure is detected by a pneumatic to electric switch, the state of which is applied to the module 140. Alternatively, for a system which has a local area network (LAN) that communicates with a central supervisory and control system, the day or night switching can be applied to the module. The detailed flow chart for the operation of this module is illustrated in FIG. 8, which is self explanatory to those of ordinary skill in the art.

The day or night status is applied on line 142 to a set point discriminator module 144 and to an operation discriminator module 146, both of which perform a multiplexing function. The module 144 has the capability of receiving specified day and night default set points, in addition to an input indicating whether the room thermostat dial is to be active or inactive, and if active, the dial set point is also an input for the module. The module also has a minimum temperature default value, which for some heating and ventilating units, places the unit into a low temperature mode of operation. The module also has a maximum temperature default value which may be lower than the maximum on the thermostat dial, and would therefore impose a limit on the room temperature that can be achieved. The output of the module 144 is provided on line 104 and is the room set point at any particular time. The detailed flow chart for the operation of these modules is illustrated in FIGS. 13 and 14, respectively, which are self explanatory to those of ordinary skill in the art.

The day or night signal on line 142 is also applied to the operation discriminator 146 which activates a day module 148 via line 150 or a night module 152 via line 154. If the low temperature limit is detected, a signal on line 156 will result in an active signal being applied on line 158 which triggers a low temperature detect module 160. Depending upon which of the three modules 148, 152 or 160 is used, the output from the chosen module controls the AOP 122 which in turn controls the operation of the heating and ventilating unit 10.

Each of the modules 148, 152 and 160 has four output lines which control the AOP device 122 and also control the operation of the fan and the outside air damper of the heating and ventilating unit. Two of the output lines control the operation of a bleed valve and a supply valve, both of which operate to modulate the output pressure in the controlled pneumatic line which control the position of the valve which controls the flow of steam or hot water through the heating coil of the unit.

During operation by the modules 152 and 160, i.e., the night and low temperature detection modules, PID loop control is not used. This is because accurate control is not needed because the room is not occupied and the temperature is maintained at a level that would not be considered comfortable by most individuals. The fan is turned off during operation by both of these modules. The important consideration for the low temperature detection module 160 is to operate so that the pipes of a hot water system do not freeze. The module does not operate the fan, but provides maximum heat through the coil, thus promoting maximum hot water flow, so that freezing does not occur. No sensed temperatures are used by the module 160. The detailed flow chart for the operation of this low temperature detect module is illustrated in FIG. 15, which is self explanatory to those of ordinary skill in the art.

The night module 152 does use the night set point and a deadband value in addition to the sensed room temperature and the module uses these inputs to maintain the night temperature at the night temperature set point. The detailed flow chart for the operation of this module is illustrated in FIG. 12, which is self explanatory to those of ordinary skill in the art.

The day module 148 controls the operation of the AOP and the heating and ventilating unit during the day mode of operation, and it utilizes the room temperature set point, the sensed room temperature, the predetermined time in which the loop is recalculated, preferably about 12 seconds, but variable and the output of the PID control loops, which are cascaded and which will be described. This module does utilize the fan and the operation of the outside air damper, and uses the output of the PID control loop 118 to control the operation of the bleed and supply valves to modulate the operation of the valve controlling the flow of steam or hot water through the heating coil. The detailed flow chart for the operation of this module is illustrated in FIG. 10, which is self explanatory to those of ordinary skill in the art.

There are three PID control loop modules in the flow chart of FIGS. 7a and 7b, and these modules are identical in their functional operation, although they have some different inputs. In this regard, the room set point on line 104 is an input to the module 110 and 130, and the discharge temperature set point is an input to the modules 130 and 118. Similarly, the sensed discharge temperature is an input to the modules 118. There are additional parameters for each of the modules, and with respect to these parameters, they are identical for the modules 118 and 130, but different for the module 110.

Broadly stated, the PID control loop 110 is richer or more robust than the control loops 118 and 130. Stated in other words, the control loop 110 is more powerful or more responsive to perturbations within the system, and is so by a factor of approximately 2.

With respect to the PID control loop module 110, it utilizes as inputs the room set point on line 104 and the sensed room temperature on line 106, in addition to several parameters that are determined based upon the characteristics of the heating and ventilating unit and the room itself. Those parameters include a determination of the loop time, which is the interval of time between successive samplings and recalculations by the controller. While this value can be varied, the default setting is preferably approximately 12 seconds. Thus, every 12 seconds, all of the PID control loop modules, including module 110, will do a recalculation to provide a current value of the discharge set point.

Since the PID control loop has three components or factors, i.e., a proportional control factor, an integral control factor and a derivative control factor, the gain values of each of these factors must be determined. The proportional gain (P gain) has a value of [° F./° F.], the derivative gain factor (D gain) has a value of [° F.]-[sec/° F.] and the integral gain factor (I gain) also has a value of [° F.]-[sec/° F.].

Another parameter to be specified is a room D gain diminishing factor which operates to reduce the effect of the D gain as a function of error that is determined. In the module 110, if there is a difference between the room temperature set point and the sensed room temperature, then the D gain is recalculated at its full D gain factor. If there is no error between recalculations, i.e., during each loop time of 12 seconds for example, then on successive recalculations the effect of the D gain is successively reduced by a factor of approximately 40%. It should be apparent that this diminishing factor may be some value other than 40% if desired.

Other parameters to be specified are the room bias value, which is the specified output of the module if no error is measured, and this is preferably 74° F., although another value can be used. Finally, maximum and minimum temperature set points must be specified, and the default setting for these are preferably 65° F. and 120° F.

The detailed flow chart for the operation of this PID module as well as the other PID modules 118 and 130 is illustrated in FIG. 9. As is shown by the flow chart, the control variable is defined as the sum of (1) the Proportional component which is the error determined during a sampling, e(n), multiplied by the P gain factor, plus (2) the Integral component, ISUM(n), plus (3) the Derivative component, DTERM(n), plus (4) the Bias component. The Integral component is determined by the equation:

$$ISUM(n) = (I\ Gain) * (loop\ time) * e(n) + ISUM(n-1)$$

The Derivative component is determined by the following equation, wherein the DG factor is a diminishing factor, preferably approximately 0.4. The impact of the diminishing factor is to reduce the derivative component by this factor at each successive recalculation, every loop or cycle time, if there is no error or difference determination. The equation is shown below:

$$DTERM(n) * (D\ gain) * (DG\ factor)/(loop\ time) * [e(n) - e(n-1)] + DTERM(n-1) * (1 - DG\ factor)$$

As can be seen from FIG. 9, the control variable from each of the PID modules is a summation of the P gain, the I gain, and the D gain and any bias component. The remainder of the flow chart will not be explained because it is self-explanatory to those of ordinary skill in art.

With respect to the other PID modules 118 and 130, they are identical to each other with respect to the parameters that are specified, but use different inputs as has been described. The parameters are different from the module 110 to reflect a somewhat different operation. Since the default bias value of 74 has been determined by the module 110, and the modules 118 and 130 operate on the output of the module 110, the bias factor for the modules 118 and 130 is set at zero, which is halfway between the maximum range of 2000, i.e., +1000 to −1000, which are the specified maximum and minimum loop output values that are possible from these modules. The outputs from these modules 118 and 130, unlike the module 110, is not a temperature, but a controlled variable that is used to operate the AOP module itself. The P gain, I gain and D gain parameters which are used for tuning the loop have different scaling in the modules 118 and 130. This has the effect of controlling the change in output as a result in a change in the error detected. The P and I gain factors are [%-10 hundred milliseconds]/[° F.-seconds] and the D gain factor is [%]−[10 hundred milliseconds/° F.]. If the output of the module is a plus value, then the AOP module is controlled to operate to increase the supply pneumatic pressure to the controlled pneumatic output line and a negative output value controls the AOP module to bleed pressure from the controlled pneumatic output line to reduce its pressure. The percentage value means the percentage of the loop time that either of such actions are performed. In meaningful terms, if the output of one of the modules is +500 and the loop time is 12 seconds, then the AOP module is controlled to increase the supply pressure to the pneumatic output line for 6 seconds.

While the foregoing description of the controller operation is directed to the preferred embodiment, another embodiment not only controls an AOP device which affects the flow of heating fluid through the heating and ventilating unit and possibly auxiliary radiation, but also controls an AOP device which controls the position of the outside air damper in a more precise way than merely opening and closing the same. The broad flow chart for operating the controller for accomplishing this control is illustrated in FIG. 17 and is intended for the application shown in FIG. 3, which also is for an ASHRAE Cycle III application. In this embodiment, there is a temperature sensor that is positioned at the outlet of the fan and preferably upstream of the heating coil. Thus, the temperature sensor senses the mixed air temperature, and it is the mixed air temperature which controls the positioning of the outside air damper in the control of the heating and ventilating unit.

Referring again to FIG. 17, the room set point is provided at block 200 and is applied to a summing junction 202 on line 204. The sensed room temperature is provided to the summing junction 202 by line 206, and the difference between the two values is applied to a PID control module 208 which provides an output on line 210 to an AOP device 212 that controls the heating coil valve of the heating and ventilating unit. The mixed air temperature set point is provided at block 214 and is applied to summing junction 216 via line 218, the other input of which is supplied by the sensed mixed air temperature via line 220. Any difference or error between the two values is applied to a PID control module 222 which produces a modulated output to control an AOP device 224 which controls the position of the outside air damper of the heating and ventilating unit.

The broad flow chart of FIG. 17 is shown in more detail in the flow chart of FIGS. 18a and 18b, which together form the total flow chart. It should be understood that while other control features are present in this more detailed flow chart, those blocks which are common to the flow charts of FIGS. 16 and 18a and 18b are provided with the same reference numbers. It should also be understood that the blocks 202 and 216 which perform the difference or error calculations are not specifically illustrated in the flow chart of FIGS. 18a and 18b, and these functions are performed by the PID blocks 208 and 222, respectively. Also, while the preferred embodiment is illustrated in FIG. 17 and that the flow chart of FIG. 18a and 18b is more detailed, the detailed flow chart includes a failure module which may not be included in all applications, and to this extent it is intended to be another alternative embodiment. It is included in FIGS. 18a and 18b because of convenience.

Detailed flow charts of certain modules of FIGS. 18a and 18b are provided in FIGS. 8, 9, 12 and 19 through 22. No additional description of these flow charts will be provided because they have either been functionally described previously, or are very similar to other flow charts that have been described. Moreover, these detailed flow charts are believed to be self explanatory to those of ordinary skill in the art.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. Apparatus for controlling a normally pneumatically controlled heating and ventilating unit for controlling the temperature of an indoor area, the unit being of the type which contains a heating means, a damper controlling the communication of air into the apparatus from an adjacent area, such as ambient outside air or the like, a means for positively moving air into the enclosed area and a pneumatic thermostat for measuring the temperature of the indoor area in which the heating and ventilating unit is located for controlling the unit to selectively heat and cool the indoor area for regulating the temperature therein, said apparatus comprising:

a housing for said apparatus;
processing means including memory means for storing instructions and data relating to the operation of said apparatus, said processing means being adapted to receive electrical signals that are indicative of temperature, said processing means generating electrical value control signals for controlling at least one valve means;
at least one valve means being adapted to be operatively connected to a pneumatic supply line and to an exhaust and having a pneumatic output line, said valve means controlling the pressure in said pneumatic output line in response to electrical valve control signals being applied to said valve means, said controlled pressure being within the range defined by the pressures that exist in said supply line and in said exhaust, said valve means generating damper control signals for controlling the operation of a damper means and heating control signals for controlling a heating means;
a first temperature sensing device which senses the indoor area temperature and generates electrical signals that are indicative of the sensed temperature and a temperature set point, said first temperatures sensing device performing the function previously performed by the pneumatic thermostat;
first receiving means operatively connected to said first temperature sensing device and communicating said electrical signals generated by said temperature sensing device to said processing means;
a second temperature sensing device which senses the temperature of the discharge air exiting the unit and generates an electrical signal that is indicative of the sensed discharge temperature;

second receiving means operatively connected to said second temperature sensing device and communicating said electrical signals generated by said second temperature sensing device to said processing means;

means for providing damper control signals for controlling the operation of the damper;

means for providing heating control signals for controlling the operation of the heating means; and, means operatively connected to said processing means for communicating with a remote controlling means.

2. Apparatus as defined in claim 1 wherein the heating means comprises a heating coil means which is heated by a source of heat, and means for controlling the source of heat that is applied to the heating coil means.

3. Apparatus as defined in claim 2 wherein the heating coil means comprises a heating coil through which a heated fluid can be circulated, said means for controlling the source of heat comprises a pneumatically controlled valve that is adjustable to regulate the flow of fluid therethrough.

4. Apparatus as defined in claim 3 wherein the heating coil means comprises an electric heating element, and said means for controlling the source of heat comprises an electrical switching means.

5. Apparatus as defined in claim 3 wherein the fluid is steam.

6. Apparatus as defined in claim 3 wherein the fluid is water.

7. Apparatus as defined in claim 1 further including means for providing auxiliary heating control signals for controlling the operation of auxiliary heating means.

8. Apparatus as defined in claim 7 wherein the auxiliary heating means comprises heating coils located externally of the ventilating unit in the indoor area.

9. Apparatus as defined in claim 1 wherein said housing is adapted to be mounted in the ceiling of the area in which the apparatus is located.

10. Apparatus as defined in claim 1 wherein said damper control signal providing means comprises circuit means connected to said processing means and to said valve means, said circuit means providing said valve control signals when said processing means provides a digital activating signal thereto.

11. Apparatus as defined in claim 10 wherein said circuit means includes an output stage which produces said valve control signals and an opto-isolator circuit for electrically isolating said processing means from said output stage, said valve control signals having a voltage level exceeding the voltage levels being produced by said processing means.

12. Apparatus as defined in claim 11 wherein said valve control signals produced by said output stage are approximately 24 volts alternating current.

13. Apparatus as defined in claim 1 wherein said heating control signal providing means comprises circuit means connected to said processing means and to said valve means, said circuit means providing said heating control signals when said processing means provides a digital activating signal thereto.

14. Apparatus as defined in claim 13 wherein said circuit means includes an output stage which produces said heating control signals and an opto-isolator circuit for electrically isolating said processing means from said output stage, said valve control signals having a voltage level exceeding the voltage levels being produced by said processing means.

15. Apparatus as defined in claim 14 wherein said valve control signals produced by said output stage are approximately 24 volts alternating current.

16. Apparatus as defined in claim 1 wherein each of said valve means comprises a first valve located in said supply line and adapted to be selectively opened to communicate said supply line with said output line to increase the pressure in said output line in response to an electrical activating signal being applied thereto, and a second valve located in said exhaust and adapted to be selectively opened to communicate said exhaust with said output line to reduce the pressure in said output line in response to an electrical activating signal being applied thereto, said processing means being adapted to selectively provide said activating signals to said first and second valves.

17. Apparatus as defined in claim 1 wherein each of said first and second valves are electrically operated solenoid valves.

18. Apparatus as defined in claim 1 wherein said electrical signal that is indicative of the sensed indoor area temperature is an analog voltage signal, said first receiving means comprises conversion means for converting said analog voltage signal to a digital signal.

19. Apparatus as defined in claim 1 wherein said electrical signal that is indicative of the sensed discharge temperature is an analog voltage signal, said second receiving means comprises conversion means for converting said analog voltage signal to a digital signal.

20. Apparatus as defined in claim 1 wherein said communicating means comprises universal asynchronous receiver and transmitter circuitry operably connected to said processing means.

21. Apparatus as defined in claim 1 wherein said memory means includes default instructions which define a temperature control algorithm which carries out the control of said apparatus.

22. Apparatus as defined in claim 21 wherein said memory means instructions which enable said remote controlling means to adjust said temperature control algorithm.

23. Apparatus as defined in claim 1 wherein said memory means includes instructions which define day and night modes of operation, with the temperature set points being independently determined for each such mode.

24. Apparatus as defined in claim 1 wherein said memory means includes instructions which define heating and cooling modes of operation, with the temperature set points being independently determined for each such mode.

25. Apparatus as defined in claim 1 wherein said memory means includes instructions which enable communications to be received from said remote controlling means and data which defines the identification of the apparatus.

26. Apparatus as defined in claim 22 wherein said memory means includes instructions which define the frequency at which said temperature control algorithm is executed.

27. Apparatus for controlling a heating and ventilating unit for controlling the temperature of an indoor area, the unit being of the type which contains a heating means, the unit having a damper controlling the communication of air into the apparatus from an adjacent area, such as ambient outside air or the like, the unit including a means for positively moving air into the enclosed area and having a pneumatic thermostat for measuring the temperature of the indoor area in which the heating and ventilating unit is located for controlling the unit to selectively heat and cool the indoor area for regulating the temperature therein, said apparatus comprising:

a housing for said apparatus;

processing means including memory means for storing instructions and data relating to the operation of said apparatus, said processing means being adapted to receive electrical signals that are indicative of temperature, said processing means generating electrical valve control signals for controlling at least one valve means;

at least one valve means being adapted to be operatively connected to a pneumatic supply line and to an exhaust and having a pneumatic output line, said valve means controlling the pressure in said pneumatic output line in response to electrical valve control signals being applied to said valve means, said controlled pressure being within the range defined by the pressures that exist in said supply line and in said exhaust, said valve means generating damper control signals for controlling the operation of a damper means and heating control signals for controlling a heating means;

means for sensing the indoor area temperature and providing signals to said processing means indicative of the sensed temperature and a temperature set point, said indoor area temperature sensing device performing the function previously performed by the pneumatic thermostat;

means for sensing the temperature of the discharge air exiting the unit and providing signals to said processing means indicative of the sensed temperature;

said valve means providing pneumatic damper control signals for controlling the operation of the damper and providing pneumatic heating control signals for controlling the operation of the heating means.

* * * * *